(12) United States Patent
Shimizu et al.

(10) Patent No.: US 8,735,796 B2
(45) Date of Patent: May 27, 2014

(54) SOLID-STATE IMAGING DEVICE COMPRISING AN ANALOG TO DIGITAL CONVERTER WITH COLUMN COMPARISON CIRCUITS, COLUMN COUNTER CIRCUITS, FIRST AND SECOND INVERTERS, AND BUFFERS

(75) Inventors: Yusuke Shimizu, Kyoto (JP); Kenichi Shimomura, Hyogo (JP)

(73) Assignee: Panasonic Corporation, Osaka (JP)

( * ) Notice: Subject to any disclaimer, the term of this patent is extended or adjusted under 35 U.S.C. 154(b) by 30 days.

(21) Appl. No.: 13/587,266

(22) Filed: Aug. 16, 2012

(65) Prior Publication Data

US 2012/0305752 A1      Dec. 6, 2012

Related U.S. Application Data

(63) Continuation of application No. PCT/JP2010/005933, filed on Oct. 4, 2010.

(30) Foreign Application Priority Data

Feb. 26, 2010   (JP) ................................. 2010-042645

(51) Int. Cl.
| | | |
|---|---|---|
| *H01L 27/00* | (2006.01) | |
| *H01J 40/14* | (2006.01) | |
| *H04N 5/335* | (2011.01) | |
| *H03M 1/34* | (2006.01) | |
| *H04N 5/378* | (2011.01) | |
| *H04N 5/3745* | (2011.01) | |

(52) U.S. Cl.
CPC ............ *H04N 5/378* (2013.01); *H04N 5/37455* (2013.01)
USPC .................... 250/208.1; 250/214 R; 348/294; 341/164

(58) Field of Classification Search
CPC ............ H01L 27/146; H01L 27/14643; H01L 27/14609; H01L 27/14603; H04N 3/155; H04N 5/335; H04N 5/378; H04N 9/045; H04N 5/3575; H04N 2/27455; G01J 1/44; H01J 40/14; H03M 1/12; H03M 1/1215; H03M 3/30; H03M 1/002; H03M 1/365; H03M 1/00; H03M 2201/4135; H03M 2201/4225; H03M 2201/4233; H03M 2201/01; H03M 2201/42
USPC ........ 250/208.1, 214 R, 214 A, 214 DC, 206; 348/308, 207.99, 294, 300, 302; 341/172, 155, 118, 120, 156, 164, 169
See application file for complete search history.

(56) References Cited

U.S. PATENT DOCUMENTS

| | | | |
|---|---|---|---|
| 7,129,883 | B2 | 10/2006 | Muramatsu et al. |
| 7,149,275 | B1 * | 12/2006 | Hubbard .......................... 377/47 |
| 7,156,486 | B2 | 1/2007 | Eguchi et al. |
| 7,292,177 | B2 * | 11/2007 | Muramatsu et al. .......... 341/164 |
| 7,315,273 | B2 | 1/2008 | Muramatsu et al. |
| 7,375,672 | B2 | 5/2008 | Muramatsu et al. |
| 7,404,162 | B2 | 7/2008 | Matsuo et al. |
| 7,532,148 | B2 | 5/2009 | Muramatsu et al. |
| 7,538,709 | B2 | 5/2009 | Muramatsu et al. |
| 7,564,398 | B2 | 7/2009 | Muramatsu et al. |
| 7,586,431 | B2 | 9/2009 | Muramatsu et al. |
| 7,671,317 | B2 * | 3/2010 | Shimomura et al. ....... 250/208.1 |
| 7,683,818 | B2 | 3/2010 | Muramatsu et al. |
| 8,132,138 | B2 | 3/2012 | Matsuo et al. |
| 2005/0195238 | A1 | 9/2005 | Eguchi et al. |
| 2005/0206548 | A1 | 9/2005 | Muramatsu et al. |
| 2006/0097902 | A1 | 5/2006 | Muramatsu et al. |
| 2007/0019091 | A1 | 1/2007 | Muramatsu et al. |
| 2007/0024728 | A1 | 2/2007 | Muramatsu et al. |
| 2007/0024729 | A1 | 2/2007 | Muramatsu et al. |
| 2007/0024730 | A1 | 2/2007 | Muramatsu et al. |
| 2007/0024731 | A1 | 2/2007 | Muramatsu et al. |
| 2007/0030187 | A1 | 2/2007 | Muramatsu et al. |
| 2007/0044054 | A1 | 2/2007 | Matsuo et al. |
| 2008/0231491 | A1 | 9/2008 | Muramatsu et al. |
| 2008/0273091 | A1 | 11/2008 | Matsuo et al. |
| 2009/0244337 | A1 | 10/2009 | Kume |
| 2010/0194949 | A1 | 8/2010 | Hisamatsu |
| 2011/0074968 | A1 * | 3/2011 | Kim et al. .................. 348/222.1 |

FOREIGN PATENT DOCUMENTS

| | | |
|---|---|---|
| JP | 2002-269166 | 9/2002 |
| JP | 2005-323331 | 11/2005 |
| JP | 2007-60036 | 3/2007 |
| JP | 2007-110630 | 4/2007 |
| JP | 2009-169981 | 7/2009 |
| JP | 2009-239382 | 10/2009 |
| JP | 2011-166197 | 8/2011 |
| WO | 2009/041474 | 4/2009 |

OTHER PUBLICATIONS

International Search Report issued Nov. 2, 2010 in International Application No. PCT/JP2010/005933.

\* cited by examiner

*Primary Examiner* — Pascal M Bui Pho
*Assistant Examiner* — Jennifer Bennett
(74) *Attorney, Agent, or Firm* — Wenderoth, Lind & Ponack, L.L.P.

(57) ABSTRACT

A solid-state imaging device includes: a column comparison circuit which compares a pixel signal with ramp waves and detects a timing at which the pixel signal and the ramp waves match; a counter circuit which is disposed for each of the pixel columns and measures the timing in the column comparison circuit by being supplied with a clock signal; and M first inverters which are equidistantly connected in series, wherein the counter circuit belongs to one of M groups corresponding to each of the M first inverters disposed in the upper clock stage, the odd-numbered group has second inverters disposed between the output terminal of the first inverter corresponding to the group and the counter circuit of the group, and the even-numbered group has buffers disposed between the output terminal of the first inverter corresponding to the group and the counter circuit of the group.

16 Claims, 10 Drawing Sheets

SOLID-STATE IMAGING DEVICE COMPRISING AN ANALOG TO DIGITAL CONVERTER WITH COLUMN COMPARISON CIRCUITS, COLUMN COUNTER CIRCUITS, FIRST AND SECOND INVERTERS, AND BUFFERS

CROSS REFERENCE TO RELATED APPLICATIONS

This is a continuation application of PCT Patent Application No. PCT/JP2010/005933 filed on Oct. 4, 2010, designating the United States of America, which is based on and claims priority of Japanese Patent Application No. 2010-042645 filed on Feb. 26, 2010. The entire disclosures of the above-identified applications, including the specifications, drawings and claims are incorporated herein by reference in their entirety.

TECHNICAL FIELD

The present invention relates to solid-state imaging devices and imaging devices, and, in particular, to a solid-state imaging device and an imaging device which have an analog-to-digital (AD) conversion function.

BACKGROUND ART

A Metal Oxide Semiconductor (MOS) sensor has an analog signal output scheme in which a signal read out from a pixel is outputted as an analog signal, and a digital signal output scheme in which a signal read out from a pixel is outputted as a digital signal by converting an analog signal into a digital signal in the sensor.

In a column AD conversion scheme of the digital signal output scheme, there is a ramp-type AD converter which is equipped with a MOS sensor and is widely used (for example, Patent Literature 1). In Patent Literature 1, the ramp-type AD converter compares a reference signal for AD conversion with a process target signal represented by the inclusion of a reference component and a signal component, and in parallel with the comparison process, performs a count process in one of a down-count mode or an up-count mode, and holds a count value at a time of the completion of the comparison process. At this time, the mode of the count process is switched according to whether the comparison process is performed for the reference component or the signal component.

In the digital signal output scheme, if a readout speed of a pixel is increased, a clock frequency of the AD converter also needs to be increased. When an operating frequency is higher, generated noise is greater. As a way to control the noise, for example, Patent Literature 2 is disclosed. According to a buffering technique disclosed in Patent Literature 2, the number of buffer stages and the number of buffer branches are calculated based on design constraints in an application field such as the maximum number of allowable buffer stages or the like.

CITATION LIST

Patent Literature

Patent Literature 1: Japanese Unexamined Patent Application Publication No. 2005-323331
Patent Literature 2: Japanese Unexamined Patent Application Publication No. 2007-60036

SUMMARY OF INVENTION

Technical Problem

However, in the buffering technique disclosed in Patent Literature 2, since a signal (including also a clock) from the start point to the end point (including a plurality of end points diverging from the starting point) is delayed by a plurality of buffers, for example, the number of necessary buffer stages is extremely large for a MOS sensor with 12 million pixels comprising a total column number of pixels of 4000 columns. Moreover, since a total clock wiring length is 16 mm (4000 columns×4 µm (in the case where a size per a unit pixel is set to 4 µm)) and is a long distance, an interconnect load is increased. When the number of buffer stages is multistage and the interconnect load is larger, one of "H" width (pulse) and "L" width (pulse) of a clock is shorter in the case where the process is varied. Especially, a waveform (pulse) at the farthest end (where a buffer is highly connected in series) collapses, and as a result, a circuit at the farthest end side does not correctly operate.

In the future, if the process is further miniaturized, the P/N balance between P-channel Metal Oxide Semiconductor (PMOS) and N-channel Metal Oxide Semiconductor (NMOS) of a transistor is easier to be lost and the pulse is more notably lost. Moreover, since the number of buffers is increased every time the total column number of pixels is increased, a layout area (longitudinal direction) is also increased.

FIG. 7 is an example of a block diagram of a column AD converter using the buffering technique disclosed in Patent Literature 2. FIG. 7 shows an example of a clock tree structure based on the buffering technique disclosed in Patent Literature 2

In a configuration illustrated in FIG. 7, counter circuits 855 in the column AD converter are arranged from the left to the right, a count clock input terminal 800 supplies a count clock to a buffer 801, and the buffer 801 supplies (branches) the output signal to a buffer 802 and a buffer 803. Moreover, the buffer 803 supplies (branches) the output signal to a buffer 804 and a buffer 807. Then, the buffer 807 is connected to a buffer 809, and the buffer 809 is connected to buffers 810, 811, and 812 such that a signal in which a count clock is sequentially delayed is supplied. The buffers 801 and 802 are disposed on a first stage 850, the buffers 803, 804, 805, and 806 are disposed on a second stage 851, the buffers 807 and 808 are disposed on a third stage 852, and buffers 809 to 824 are disposed on a fourth stage 853. The buffers 813 to 816, the buffers 817 to 820, and the buffers 821 to 824 are connected in series, respectively, as similarly to the buffers 809 to 812.

The buffer 802 plays a role to prevent simultaneous operations of the 1st to the 8th column of the counter circuit 855, and the 9th to 16th column of the counter circuit 855, as much as possible. The number of buffer stages which are used for output from the count clock input terminal 800 to the buffer 824 is eight (16 stages in terms of inverter), and the number of stages is four. It should be noted that each of the buffers, like the buffer 802, is connected to an inverter 825 and an inverter 826 in series.

FIG. 8A is an example of a block diagram of a column AD converter using the buffering technique disclosed in Patent Literature 2. FIG. 8A shows that the number of counter circuits in the column AD converter illustrated in FIG. 7 is increased from 16 columns to 32 columns.

In a configuration of FIG. 8A, counter circuits 955 in the column AD converter are arranged in 32 columns from the left to the right, a count clock input terminal 900 supplies a count clock to a buffer 901, and the buffer 901 supplies (branches) the output signal to a buffer 902 and a buffer 903. It should be noted that a configuration after an output of the buffer 903 is identical to a configuration after an output of the buffer 801 illustrated in FIG. 7. A configuration of the next and following stages of the buffer 902 is also the same.

The clock tree structure uses a configuration in which peak electric power of counter circuits is decreased as much as possible according to Expression 1 and Expression 2 described in Patent Literature 2, as similar to a configuration illustrated in FIG. 7, and a buffer for delay is supplied to each of the end points in multiple stages.

[Math. 1]

Average number of branches=10^((log N)/S)    (Expression 1)

[Math. 2]

Required number of stages=ceil(log x(N))    (Expression 2)

Here, N denotes the number of sink points, and S denotes the maximum number of possible stages. Moreover, x denotes an average number of branches calculated by Expression 1, and ceil indicates that the obtained result is rounded up.

In the configuration illustrated in FIG. 8A, the number of columns is doubled and the number of buffers used from the count clock input terminal 900 to the buffer 904 is 10 stages (20 stages in terms of inverter), which means an increase of two stages (4 stages in terms of inverter) compared with the configuration illustrates in FIG. 7, and the number of stages is five of a first stage 910, a second stage 911, a third stage 912, a fourth stage 913, and a fifth stage 914, which means an increase of one stage.

Hereafter, a change in waveform in the 10 buffer stages (20 stages in terms of inverter) from an input of the buffer 901 to an output of the buffer 904 in FIG. 8A will be described. After considering a variation in processes of a PMOS transistor and an NMOS transistor, a buffer size (P/N balance of 20 serially connected inverters) is already adjusted.

However, a balance (duty) between "H" width and "L" width of the count clock gradually collapses every time the count clock passes a buffer stage. For example, the "H" width is decreased by 30 ps per a buffer stage. In this case, in the 10 serially connected buffer stages, the "H" width is decreased by 30 ps×10 stages=300 ps (=0.3 ns).

FIG. 8B shows a comparative view of input and output waveforms of a buffer comprising a clock tree. In the case where an input count clock frequency of the buffer 901 is 243 MHz, a cycle of the count clock is 4.12 ns. Then, if a duty is 50%, the "H" width (pulse) of the count clock is 2.06 ns. When the count clock passes the 10 serially connected buffers, the "H" width of the input count clock of the buffer 901 is 2.06 ns, while 1.76 ns which is a value in which 0.3 ns being a decreased amount of "H" after the passage of the 10 serially connected buffer stages is subtracted becomes the "H" width of the output count clock of the buffer 904, with a result that there is a difference in both waveform diagrams as illustrated in the waveform diagrams of FIG. 8B. The duty of the output count clock of the buffer 904 is decreased by 1.76/4.12=42.7%.

The above described difference is restricted to this extent because in the configuration illustrated in FIG. 8A, the number of columns of the counter circuits in the column AD converter is 32. For example, because the number of columns in the 12 million pixel sensor is 4000, in this case, the number of stages is 23 (46 stages in terms of inverter) based on calculation of the minimum number of buffer stages necessary given Expression 1. In this case, a decreased amount of the "H" width is 0.69 ns and the clock duty in the final buffer is 1.37/4.12=33.3%. Here, since a maximum decrease in the number of buffer stages is prioritized, the number of buffer stages is increased from 5 to 8, with a result that a new problem occurs that the layout area is increased.

FIG. 8C shows a comparative view of input and output waveforms of a buffer comprising a clock tree in the case where the frequency of the count clock is doubled. In other words, the waveforms illustrated in FIG. 8C, with respect to the waveforms illustrated in FIG. 8B, are those in which the frequency of the count clock input terminal 900 inputted into the buffer 901 is doubled. For example, in the case where the frequency of the count clock input terminal 900 is set to 486 MHz, one cycle of the count clock is 2.06 ns. More over, if a duty is set to 50%, the "H" width of the count clock is 1.03 ns. When the count clock passes the 10 serially connected buffers, 0.73 which is a value in which 0.3 ns being a decreased amount of "H" after the passage of 10 serially connected buffer stages is subtracted from 1.03 ns of the "H" width of an input count clock becomes the "H" width (pulse) of the output count clock of the buffer 904 (FIG. 8C). The duty of the output count clock of the buffer 904 is decreased by 0.73/2.06=35.4%, resulting in a further decrease. The duty 42.7% of the waveform illustrated in FIG. 8B changes to the duty 35.4% of the waveform illustrated in FIG. 8C, which indicates that when the frequency is higher, the duty is extremely degraded. In other words, the clock tree structure in the conventional example has a problem that it is unsuitable for the number of columns of the column AD converter and for the frequency of the count clock (speedup of the AD converter) to increase.

Moreover, in the counter circuits of the AD converter, there are a counter circuit of a Single Data Rate (SDR) scheme and a counter circuit of a Double Data Rate (DDR) scheme.

The counter circuit of the SDR scheme determines from the least significant to most significant bits as a ripple counter and performs a count with only one of the rising and falling edges of one cycle of the count clock (In other words, a count of +1 or −1 is performed in one cycle of the count clock). In this scheme, there is no problem as long as a pulse does not completely collapse even if there is a change in the clock duty.

However, in the DDR scheme, a change in the clock duty directly leads to deterioration in capability. The following will describe the reason.

In the counter circuit of the DDR scheme, after a latch circuit in which a count clock is inputted as data is determined as the least significant bit and the second bit to the most significant bit are determined as a ripple counter as similarly to the SDR scheme, a count is performed with both a rising edge and a falling edge of one cycle of the count clock (In other words, a count of +1 or a count of −1 is performed with half a cycle of the count clock. With respect to the counter circuit of the SDR scheme, since the count frequency is doubled, the counter circuit of the DDR scheme is effective for speedup of the AD conversion and an increase in bit accuracy). It should be noted that in this case, the duty of the count clock must be set to 50%. If the balance (duty) between the "H" width and the "L" width of the count clock is lost, the differential linearity of the AD conversion is degraded and the accuracy of the AD conversion is decreased.

In view of the above described problems, the present invention has an object to provide a column AD converter, in particular, a means in which, in a MOS-type solid-state imaging device having a ramp-type AD converter, accuracy of clock waveform to each of the column circuits is enhanced, speedup and higher accuracy of the AD conversion can be realized, and the quality of moving images and still images by the speedup and higher accuracy of the AD conversion can be realized.

Solution to Problem

In order to solve the above described problems, a solid-state imaging device according to an aspect of the present invention includes a pixel array in which unit pixels are arranged in a two-dimensional matrix, the pixel array having N columns where N is a natural number, and the unit pixels each including a photoelectric conversion element; readout signal lines each of which is provided for each of the pixel columns, for reading out a pixel signal from the unit pixels; and a ramp-type analog-to-digital (AD) converter which is provided adjacent to the pixel array and performs AD conversion on the pixel signal with ramp waves, the pixel signal being outputted via the readout signal lines, wherein the ramp-type AD converter includes: a digital-to-analog (DA) conversion circuit which generates the ramp waves; column comparison circuits each of which is provided for a corresponding one of the pixel columns, and compares the pixel signal with the ramp waves and detects a timing at which a voltage of the pixel signal and a voltage of the ramp waves match; column counter circuits each of which is provided for a corresponding one of the pixel columns and measures a period of time from a start of comparison in the column comparison circuit to the timing by being supplied with a clock signal; and M first inverters which are connected in series at substantially equal intervals such that all of the column counter circuits are along a direction in which all of the column counter circuits are one-dimensionally arranged, the M first inverters being included in an upper clock stage, and M being less than N, wherein the column counter circuit belongs to one of M column counter circuit groups which correspond one-to-one to the M first inverters, an odd-numbered group of the column counter circuits has second inverters each of which is for each of the column counter circuits, the second inverters being disposed in a lower clock stage and being between an output terminal of one of the first inverters corresponding to the column counter circuit group and one of the column counter circuits belonging to the column counter circuit group, an even-numbered group of the column counter circuits has buffers each of which is for each of the column counter circuits, the buffers being disposed in the lower clock stage and being between the output terminal of one of the first inverters corresponding to the column counter circuit group and one of the column counter circuits belonging to the column counter circuit group, and the clock signal is distributed to the column counter circuit in an order of the upper clock stage and the lower clock stage.

With this aspect, even if a pixel array has a large number of pixels, a count clock can be supplied to each of the column AD converters in a state in which a decrease in the duty of the count clock used for the AD conversion of pixel signals is restricted. This makes it easier to realize extension of AD conversion bit width and an increase in the number of pixels that directly connect to improvement of image quality of still images, and makes it possible to increase a frame rate and obtain smoother moving images.

Furthermore, the number of clock buffer stages can be two stages (only the first stage and the second stage) regardless of the number of columns of column AD converters. Therefore, an increase in the layout area can be restricted.

In order to solve the above described problems, a solid-state imaging device according to an aspect of the present invention includes a pixel array in which unit pixels are arranged in a two-dimensional matrix, the pixel array having N columns where N is a natural number, and the unit pixels each including a photoelectric conversion element; readout signal lines each of which is provided for each of the pixel columns, for reading out a pixel signal from the unit pixels; and a ramp-type analog-to-digital (AD) converter which is provided adjacent to the pixel array and performs AD conversion on the pixel signal with ramp waves, the pixel signal being outputted via the readout signal lines, wherein the ramp-type AD converter includes: a digital-to-analog (DA) conversion circuit which generates the ramp waves; column comparison circuits each of which is provided for a corresponding one of the pixel columns, and compares the pixel signal with the ramp waves and detects a timing at which a voltage of the pixel signal and a voltage of the ramp waves match; column counter circuits each of which is provided for a corresponding one of the pixel columns and measures a period of time from a start of comparison in the column comparison circuit to the timing by being supplied with a clock signal; and M first inverters which are connected in series at substantially equal intervals such that all of the column counter circuits are along a direction in which all of the column counter circuits are one-dimensionally arranged, the M first inverters being included in an upper clock stage, and M being less than N, wherein the column counter circuit belongs to one of M column counter circuit groups which correspond one-to-one to the M first inverters, an odd-numbered group of the column counter circuits has buffers each of which is for each of the column counter circuits, the buffers being disposed in a lower clock stage and being between an output terminal of one of the first inverters corresponding to the column counter circuit group and one of the column counter circuits belonging to the column counter circuit group, an even-numbered group of the column counter circuits has second inverters each of which is for each of the column counter circuits, the second inverters being disposed in the lower clock stage and between the output terminal of one of the first inverters corresponding to the column counter circuit group and one of the column counter circuits belonging to the column counter circuit group, and the clock signal is distributed to the column counter circuit in an order of the upper clock stage and the lower clock stage.

With this aspect, in the lower clock stage of an odd-numbered column counter circuit group, a buffer is supplied for each of the column corner circuits, while in the lower clock stage of an even-numbered counter circuit group, the second inverter is disposed for each of the column counter circuits. In this case, the aspect can correspond to the case where an antiphase clock signal is inputted, and a count clock can be supplied to an AD converter of each corresponding column in a state in which a decrease in the duty of the count clock used for the AD conversion of pixel signals is restricted. Therefore, it is easier to realize extension of AD conversion bit width and an increase in the number of pixels that directly connect to improvement of image quality of still images, and it is possible to increase a frame rate and to obtain smoother moving images.

Furthermore, the number of clock buffer stages can be two stages (only the first stage and the second stage) regardless of the number of columns of column AD converters. Therefore, an increase in the layout area can be restricted.

Moreover, the clock signal (i) is inputted from an input terminal of the first inverter corresponding to a column counter circuit group located first among the column counter circuit groups, (ii) passes the first inverter corresponding to a column counter circuit group to which a column counter circuit belongs, (iii) passes the output terminal of the first inverter, and the second inverter or the buffer connected between the output terminal and the column counter circuit, and (iv) is distributed to the column counter circuit, the first inverter being included in the upper clock stage.

With the present aspect, a clock signal passes M serially connected inverters of the upper clock stage and a buffer of the lower clock stage at the longest until the clock signal is supplied to the column counter circuit. In the case where an inverter is used as a repeater comprising the clock tree, an output of a first subinverter and an output of a second subinverter that are constituent elements of the inverter can be the same load, and therefore variations in the first subinverter can be absorbed. With this, in the present aspect in which a repeater is composed of an inverter, variations in waveform are restricted and a degree in decrease in the high-level width of the waveform is small. Therefore, a count clock can be supplied to each of the column AD converters in a state in which a decrease in the duty of the count clock used for the AD conversion of pixel signals is restricted.

Moreover, it is favorable that the column counter circuit measures a period of time from the start of comparison in the column comparison circuit to the timing, by using both rising and falling edges of a waveform of the distributed clock signal.

The counter circuit of the SDR scheme determines that the least significant bit to the most significant bit are a ripple counter, and a count is performed only with one of a rising edge and a falling edge of one cycle of the count clock. In this scheme, there is no problem as long as a pulse does not completely collapse even if there is a change in the clock duty.

Meanwhile, in the counter circuit of the DDR scheme, after a latch circuit in which a count clock is inputted as data is determined as the least significant bit and the second bit to the most significant bit are determined as a ripple counter as similarly to the SDR scheme, a count is performed with both a rising edge and a falling edge of one cycle of the count clock. Compared with the counter circuit of the SDR scheme, the count frequency is doubled for the counter circuit of the DDR scheme, and therefore, the counter circuit of the DDR scheme is effective for speedup of the AD conversion and an increase in bit accuracy. However, since the DDR scheme is a count scheme using both edges, an occurrence of a change in the clock duty results in a decrease in accuracy of a detected bit.

According to the present aspect, a decrease in the duty of the count clock can be restricted and the DDR scheme can be actively used.

Moreover, it is favorable that the upper clock stage includes a first power source line and a first ground wire for supplying voltage or electric current to the M first inverters, and a decoupling capacitor between the first power source line and the first ground wire.

According to the present aspect, a distance in which a charge transfers in a power line and a ground wire can be reduced as much as possible and a wiring loop area in which supply current is flowing can be reduced. With this, the inverter and the buffer are not affected by a change in voltage caused by operations of the other inverter and buffer. With this, peak noise which occurs in the upper clock stage and the column counter circuit (power source fluctuation and GND fluctuation) can be restricted. Therefore, a degree of decrease in high-level and low-level width of the clock signal can be restricted.

Moreover, it is favorable that the lower clock stage includes a second power source line and a second ground wire for supplying voltage or electric current to all second inverters and all the buffers, and a decoupling capacitor between the second power source line and the second ground wire.

According to the present aspect, peak noise which occurs in the lower clock stage and the column counter circuit (power source fluctuation and GND fluctuation) can be restricted. Therefore, a degree of decrease in high-level width and low-level width of the clock signal can be restricted.

Moreover, it is favorable that the decoupling capacitor is disposed corresponding to each of the M first inverters.

Furthermore, it is favorable that the decoupling capacitor is disposed for each of the pixel columns.

It is favorable that a distance in which a charge transfers in a power line and a ground wire is reduced as much as possible by the decoupling capacitor. Therefore, by the disposition of the decoupling capacitors at a narrower pitch, a degree of decrease in high-level width and low-level width of the clock signal can be more effectively restricted.

Moreover, the present invention can be implemented as a solid-state imaging device with the above-described features, and an imaging device including the solid-state imaging device has the same configuration and effect as the above described configuration and effect.

Advantageous Effects of Invention

With the solid-state imaging device and the imaging device according to the present invention, in a MOS-type solid-state imaging device equipped with a ramp-type AD converter, a clock signal for a counter (a count clock) can be supplied to each of the column AD converter while the waveform of the clock signal for count is maintained at high accuracy (a decrease in the duty of the clock is restricted). Therefore, it is easier to realize extension of AD conversion bit width and an increase in the number of pixels that directly connect to improvement of image quality of still images, and it is possible to increase a frame rate and to obtain smoother moving images.

Furthermore, the number of clock buffer stages can be two stages (only the first stage and the second stage) regardless of the number of columns of column AD converters and therefore an increase in the layout area can be restricted, while by providing dedicated power source and GND wiring to each of the clock buffer stages and by adding decoupling capacity, peak current and an increase in noise caused by the peak current can be restricted.

BRIEF DESCRIPTION OF DRAWINGS

These and other advantages and features of exemplary embodiments of the present disclosure will become apparent from the following description thereof taken in conjunction with the accompanying Drawings that illustrate general and specific exemplary embodiments of the present disclosure. In the Drawings.

DESCRIPTION OF EMBODIMENTS

Embodiment 1

A solid-state imaging device according to the present embodiment includes a column processing unit which includes: a DA conversion circuit which generates ramp waves; a comparator which compares a pixel signal with a ramp wave signal; and a counter circuit in which a period of time is measured until the pixel signal and the ramp wave signal match and the result is held as a count value. The column processing unit includes a first stage which has first inverters sequentially connected, as a buffering means for operating the counter circuit, and disposed at an equal interval to a farthest end portion of a column, and a second stage in which second inverters having m columns are connected in parallel to an output terminal of the odd-numbered first inverter in the first stage while buffers of m columns are connected in parallel to an output terminal of the even-numbered first inverter. Then, the second inverter and the buffers in the second stage are connected to a counter circuit for each of the columns. With this, a decrease in the duty of the count clock is restricted and therefore a count signal can be supplied to a counter circuit.

The following will describe the MOS solid-state imaging device according to the present invention with reference to the drawings.

Figure 1:
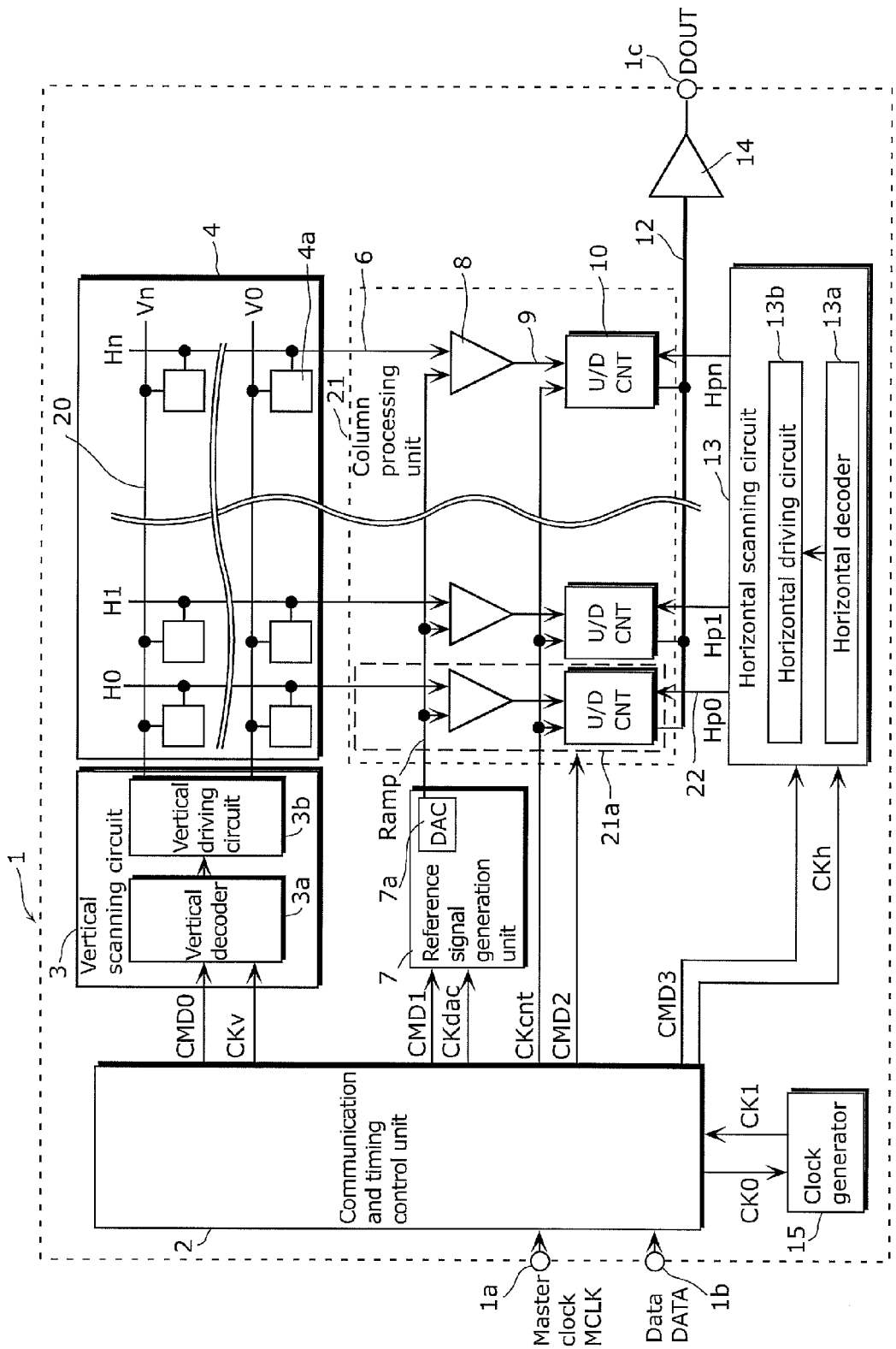
FIG. 1 is a functional block diagram of a MOS-type solid-state imaging device according to Embodiment 1 of the present invention.

FIG. 1 is a functional block diagram of a MOS-type solid-state imaging device according to Embodiment 1 of the present invention. It should be noted that the MOS-type solid-state imaging device is an aspect of an electronic device according to the present invention.

A solid-state imaging device 1 includes a pixel array 4 in which a plurality of unit pixels 4a each including a photoelectric conversion device outputting an electric signal according to the incident quantity of light are arranged in a two-dimensional matrix, and a Correlated Double Sampling (CDS) processing function unit which performs a simultaneous parallel processing of a signal output from each of the pixels, an Analog Digital Converter (ADC), and the like are provided in a column parallel. The CDS processing function unit and the ADC are included in a column processing unit 21, for example.

Here, "the CDS processing function unit and the ADC are provided in column parallel" means that a plurality of CDS processing function units and ADCs are provided substantially in parallel with a plurality of vertical signal lines 6 that are readout signal lines for all columns. When the device is overviewed, there may be a configuration in which each of the function units are disposed only on one of the far end sides (an output side disposed on the bottom of FIG. 1) in a column direction with respect to the pixel array 4, and a configuration in which each of the function units are separately disposed on one of the far end sides (an output side disposed on the bottom of FIG. 1) in a column direction with respect to the pixel array 4 and the other far end side which is opposite to the side (the upper side of FIG. 1). In the case of the latter, it is favorable that a horizontal scanning unit which performs readout scanning (horizontal scanning) in a row direction is also disposed on each of the far end sides and each of the horizontal scanning units can operate independently.

For example, a typical example where the CDS processing function unit and the ADC are provided in column parallel is a configuration in which the CDS processing function unit and the ADC are supplied for each of the pixel columns to a portion called a columnar region provided on an output side of an imaging unit. Moreover, it is possible to adopt a configuration in which one CDS processing function unit and one ADC are allocated to adjacent vertical signal lines 6 (for example, two lines) and a configuration in which a plurality of the CDS processing function units and the ADCs are allocated to one vertical signal line 6.

A clock generator 15 includes a frequency multiplier circuit which generates a pulse with a clock frequency faster than the inputted clock frequency. The clock generator 15 receives a clock CK0 from a communication and timing control unit 2 and generates, based on it, a clock with a frequency double or more than the frequency of the received clock.

The pixel array 4 is configured in an array disposition in a two-dimensional matrix of unit pixels 4a each including a photoelectric conversion element such as a photodiode. As an example of the unit pixel 4a, with respect to a photoelectric conversion element, there are a readout selection transistor as an example of a charge readout unit (transfer gate unit/readout gate unit), a reset transistor as an example of a reset gate unit, a vertical selection transistor, and an amplification transistor having a source follower configuration as an example of a detection element that detects a potential change in floating diffusion. It is possible for the above described configuration to have a structure comprising general-purpose 4 transistors as a MOS sensor and a structure comprising three transistors by omitting a vertical selection transistor from the structure comprising the 4 transistors.

Moreover, the solid-state imaging device 1 includes a horizontal scanning circuit 13, a vertical scanning circuit 3, and the communication and timing control unit 2. The horizontal scanning circuit 13 has a function of reading out a count value which is an AD conversion result for each of the columns by sequentially selecting each of the columns of the column processing unit 21.

The unit pixel 4a is connected with the vertical scanning circuit 3 via a row control line 20 for row selection and with the column processing unit 21 in which a column AD circuit 21a is provided for each of the columns via the vertical signal line 6, respectively. Here, the row control line 20 shows an overall wiring which enters a pixel from the vertical scanning circuit 3.

The horizontal scanning circuit 13 and the vertical scanning circuit 3, as described later, are configured by including a decoder and start a shift operation (scanning) in response to a command signal CMD0 given from the communication and timing control unit 2. The row control line 20 includes a variety of pulse signals for driving the unit pixel 4a (for example, a reset pulse, a transfer pulse, a control pulse, and the like) and is driven by the vertical scanning circuit 3.

The communication and timing control unit 2, although not illustrated, includes (i) a functional block of a timing generator TG (an example of a readout address control device) that supplies a clock necessary for operation for each of the units and a pulse signal at a predetermined timing and (ii) a function block of a communication interface which receives a master clock MCLK via a terminal 1a, receives data DATA that give a command of an operation mode or the like via a terminal 1b, and further outputs data including information of the solid-state imaging device 1.

For example, a horizontal address signal is outputted to a horizontal decoder 13a while a vertical address signal is outputted to a vertical decoder 3a, and then the horizontal decoder 13a and the vertical decoder 3a each select a row or a column corresponding to the address signals.

Because, at this time, the unit pixel 4a is disposed in a two-dimensional matrix, a (vertical) scan reading is performed for accessing by a row unit (column parallel) and obtaining an analog pixel signal which is generated by a pixel signal generation unit and is outputted to a column direction via the vertical signal line 6. It is favorable that after that, a high-speed readout of a pixel signal and pixel data is realized by performing a (horizontal) scan reading for accessing a row direction (a horizontal direction in the drawing) which is an arrangement direction of a column and reading out the pixel signal (digitized pixel data in this example) to the output side. Of course, by not only a scan reading but also directly addressing the unit pixel 4a to be read out, it is possible to perform a random access for reading out only information of the necessary unit pixel 4a.

The communication and timing control unit 2 according to Embodiment 1 supplies, to each units of the device, for example, the horizontal scanning circuit 13, the vertical scanning circuit 3, the column processing unit 21, and the like, a clock of the same frequency as the frequency of the master clock MCLK inputted via the terminal 1a, and a clock which divides the frequency of the clock, or a clock in which the frequency is multiplied via the clock generator 15.

The vertical scanning circuit 3 selects a row of the pixel array 4 in synchronization with a clock CKv generated by the communication and timing control unit 2, and supplies the necessary pulse to the row. For example, the vertical scanning unit 3 includes the vertical decoder 3a which determines a readout row in a vertical direction (selects a row of the pixel array 4) and a vertical driving circuit 3b which drives by supplying a pulse to the row control line 20 with respect to the unit pixel 4a on the readout address (row direction) determined by the vertical decoder 3a. It should be noted that the vertical decoder 3a selects a row for reading out a signal, a row for an electronic shutter, and the like.

The horizontal scanning circuit 13 sequentially selects a column AD circuit 21a of the column processing unit 21 in synchronization with a clock CKh generated by the communication and timing control unit 2, and leads the signal to a horizontal signal line (horizontal output line) 12. The horizontal scanning circuit 13, for example, includes the horizontal decoder 13a which determines a readout column in a horizontal direction (selects an individual column AD circuit 21a of the column processing unit 21) and a horizontal driving circuit 13b which leads each of the signals of the column processing unit 21 to the horizontal signal line 12 according to a readout address determined by the horizontal decoder 13a (It is acceptable to use a shift register as a means for determining a readout address of the horizontal scanning circuit 13). It should be noted that if the number of bits n handled by the column AD circuit 21a is n bits (n is a positive integer), for example, 15 (=n) bits, 15 horizontal signal lines 12, for example, may be disposed according to the number of bits such that the bits of a column are transferred in parallel and 60 horizontal signal lines 12 may be disposed such that the bits of four columns are transferred in parallel.

In the solid-state imaging device 1 with such a configuration, a pixel signal outputted from the unit pixel 4a is supplied to the column AD circuit 21a of the column processing unit 21 via the vertical signal line 6 for each of the columns.

Each of the column AD circuits 21a of the column processing unit 21 processes, on receipt of a column of pixel signals, the signals. For example, each of the column AD circuits 21a has an AD conversion function of converting an analog signal into 15-bit digital data with the use of a clock CKdac.

The AD conversion function will be described in detail later. The AD conversion is performed by starting a count (number count) of a clock signal while supplying a ramp reference voltage signal Ramp to a voltage comparator (hereafter, referred to as comparator), comparing the inputted analog pixel signal via the vertical signal line 6 with the reference voltage signal Ramp, and counting until a pulse signal indicating a potential match in the comparator is obtained.

The pixel data digitized by the column AD circuit 21a is transmitted to the horizontal signal line 12 via a horizontal selection switch which is not illustrated and driven by a horizontal selection signal from the horizontal scanning circuit 13, and is further inputted into an output buffer 14. It should be noted that 15 bits are an example and the number of bits may be less than 15 bits (for example, 10 bits), or another number of bits such as the number of bits which is more than 15 bits (for example, 16 bits).

With this configuration, from the pixel array 4 including the photoelectric conversion element arranged in rows and columns, a pixel signal for each of the columns is outputted in a row sequence. An image, that is, a frame image, which corresponds to the pixel array 4 in which photoelectric conversion elements are arranged in rows and columns is represented by a group of pixel signals of the whole of the pixel array 4.

Moreover, a reference signal generation unit 7 comprises a Digital Analog Converter (DAC) 7a, and generates, from an initial value indicated by command data CMD1 from the communication and timing control unit 2, a signal Ramp which is a ramp wave described as a stepped shape or a saw-toothed shape in synchronization with the count clock CKdac, and supplies the generated ramp waves to an individual column AD circuit 21a of the column processing unit 21 as a reference voltage for AD conversion (ADC standard signal).

It should be noted that the ramp waves can be converted at a speed higher than generating based on a master clock MCLK inputted via the terminal 1a, by generating based on a high-speed clock from the clock generator 15, for example, a multiplier clock generated by a multiplier circuit.

The command data CMD1 which is supplied from the communication and timing control unit 2 to the DA conversion circuit 7a of the reference signal generation unit 7 also includes information about a change rate of digital data with respect to time such that ramp voltage after every comparison processing is the same slope (change rate). Specifically, a count value is generally changed into a linear form by one per unit time, but may be changed into a non-linear form.

The column AD circuit 21a has an n-bit AD conversion function of comprising a comparator 8 which compares a reference voltage signal Ramp generated by the DA conversion circuit 7a of the reference signal generation unit 7 with an analog pixel signal which is obtained for every row control line 20 (V0, V1, . . . Vn) from the unit pixel 4a via vertical signal lines 6 (H0, H1, . . . Hn), and a counter circuit 10 which counts time until two identical signals compared by the comparator 8 are detected and holds the result.

The comparator 8 is provided for each of the pixel columns and is a column comparison circuit which compares the pixel signal and the ramp waves and then detects a timing when a voltage of the pixel signal and a voltage of the ramp waves match.

The communication and timing control unit 2 has a function of a control unit which switches a mode of a count process in the counter circuit 10 according to whether the comparator 8 is performing a comparison processing for a noise component ΔV or a signal component Vsig of a pixel signal. From the communication and timing control unit 2 to the counter circuit 10 for each of the column AD circuits 21a, a command signal CMD2 is inputted for instructing the counter circuit to operate in a down-count mode or an up-count mode.

A reference voltage signal Ramp generated by the reference signal generation unit 7 is inputted into one of the input terminals of the comparator 8 as commonly to the input terminal of the other comparator 8, and the other input terminal is connected to the vertical signal line 6 of each of the corresponding columns and a pixel signal voltage from the pixel array 4 is individually inputted to the other input terminal. An output signal of the comparator 8 is supplied to the counter circuit 10.

The counter circuit 10 is provided for each of the pixel columns and is a column counter circuit which measures time from a start of comparison by the comparator 8 until the timing by being supplied with the clock signal.

A count clock CKcnt is, commonly for all columns, inputted from the communication and timing control unit 2 into a clock terminal of the counter circuit 10.

The counter circuit 10 is configured to perform an internal count by an input of a count clock CKcnt. As similarly to the reference voltage signal Ramp, the count clock CKcnt can have a speed higher than the speed through generating based on a master clock MCLK inputted via the terminal 1a, by generating based on a high-speed clock (for example, a multiplier lock) from the clock generator 15.

Here, the counter circuit 10 is a up-down counter which can make a switch between a down-count operation and an up-count operation while the count value is held.

In the counter circuit 10 according to the present embodiment, it can be considered to use one of (i) a synchronous counter in which a count output value is outputted in synchronization with the count clock CKcnt (a counter which an operation of all flip-flops (counter basic element) is restricted by the count clock CKcnt) and (ii) an asynchronous counter in which the operation limit frequency is determined only by the limit frequency of the first flip-flop (counter basic element). Of the use of the two, it is favorable that the counter circuit 10 uses an asynchronous counter suitable for a high-speed operation.

The counter circuit 10 starts a count operation in a down-count mode or an up-count mode in synchronization with a ramp waveform voltage generated from the reference signal generation unit 7. Then, when information in which comparator output signal CMPout9 has been inverted (in the present example it is transited from "L" to "H") is notified to the counter circuit 10, the AD conversion is completed by stopping the count operation and latching (holding and storing) the count value as pixel data.

Later, the pixel data stored and held by the counter circuit 10 are sequentially selected and read out by a horizontal selection signal Hpn (Hp0, Hp1, Hp2, . . . Hpn) which is inputted at a predetermined timing from the horizontal scanning circuit 13 via the column control line 22 and is outputted as DOUT from an output terminal 1c to outside the chip.

The column processing unit 21 and the reference signal generation unit 7 are provided at adjacent locations on the pixel array 4 and are a ramp-type column AD converter which performs AD conversion of a pixel signal outputted via the vertical signal line 6 with the use of ramp waves.

It should be noted that the unit pixel 4a illustrated in FIG. 1 may be a structure comprising a pixel (photodiode), a transfer transistor, a floating diffusion (FD), a reset transistor, and an amplifier transistor, that is, a so-called one-pixel one-cell structure, or a structure in which a plurality of pixels and one of an FD, a reset transistor, an amplifier transistor, or all of them are shared in a unit cell, that is, a so-called multi-pixel one-cell structure. In other words, the multi-pixel one-cell structure allows for sharing a reset transistor, a readout transistor, and a selection transistor in a plurality of adjacent photoelectric conversion elements, substantially reduces the number of transistors per a photoelectric conversion element, and can be applied as a constituent element to the solid-state imaging device according to the present invention.

Moreover, the pixels may be formed on a surface of a semiconductor substrate, that is, by a structure in which the pixels are formed on the same surface as that on which a transistor gate terminal and wiring are formed, and the pixels may be formed on a back surface of a semiconductor substrate, that is, by a structure of a backside illuminated image sensor (backside illuminated solid-state imaging device) in which the pixels are formed on the back side of the surface on which a transistor gate terminal and wiring are formed.

Figure 2:
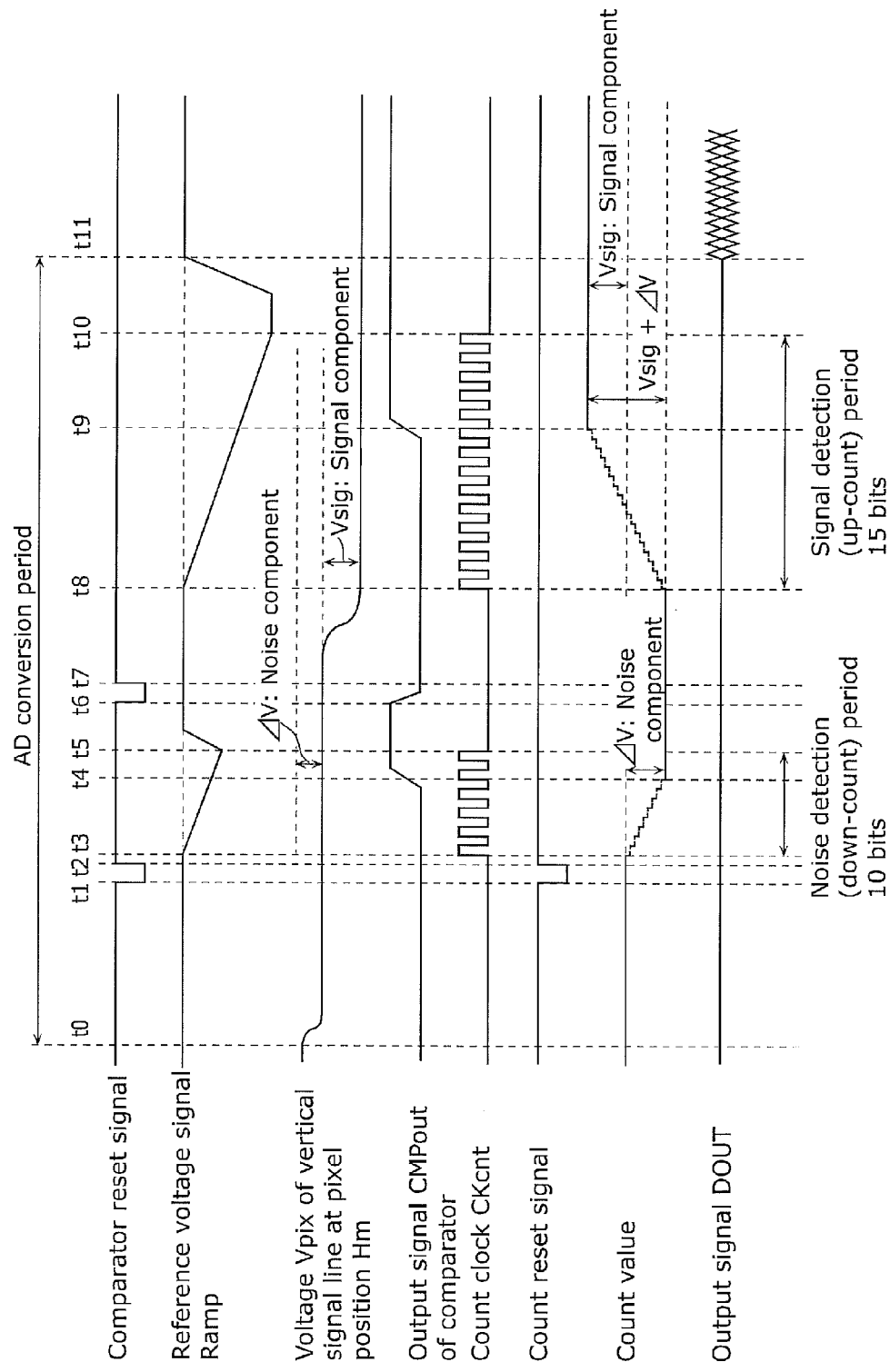
FIG. 2 is an operation timing chart of a column AD circuit held by the solid-state imaging device according to Embodiment 1 of the present invention.

FIG. 2 is an operation timing chart of a column AD circuit held by the solid-state imaging device according to Embodiment 1 of the present invention.

Here, the column AD circuit 21a held by the solid-state imaging device 1 comprises the comparator 8 and the counter circuit 10, and has an object to sequentially perform AD conversion on a pixel signal of the unit pixel 4a disposed in a two-dimensional matrix. An AD conversion period (time t0 to time t11) illustrated in FIG. 2 includes a period for detecting a noise component generated by the unit pixel 4a, the vertical signal line 6, the comparator 8, and the counter circuit 10 (noise detection period (time t3 to time t5)), and a period for detecting a signal component of an incident amount of light (signal detection period (time t8 to time t10)).

The following will describe an operation of the column AD circuit 21a in the noise detection period and the signal detection period.

First, common to all columns, the column AD circuit 21a has an "L" input of a comparator reset signal in a period from time t1 to time t2 and resets the function of the comparator 8 (an output signal CMPout9 of the comparator 8 is set to "L"). At this time, the reference voltage signal Ramp is set to its initial value.

Next, the column AD circuit 21a inputs, to one of the input terminals of the comparator 8 for each of the columns, a voltage $V_{pix}$ of the vertical signal line (output signal ΔV from each of the unit pixels 4a ($H_0$, $H_1$, . . . Hn) of row Vm amplified by a floating diffusion amplifier), and, to the other input terminal, the reference voltage signal Ramp in a period from time t3 to time t5 (sweep as illustrated in FIG. 4). When the former voltage is identical to the latter voltage (time t4), the output signal CMPout9 of the comparator 8 outputs "H" (A signal potential is different for each pixel and the matching timing (time t4) is different for each column, but in FIG. 2, a waveform focusing on a comparator of a column is shown). Meanwhile, "L" is inputted into the counter circuits 10 of all columns as a count reset signal in a period from time 1 to time 2, and for example, a count value is set to 1024. At time t3, a sweep of the reference voltage signal Ramp is started and an input of a count clock CKcnt to clock input terminals of the counter circuits 10 for all columns is started at the same time, and the input is continued in a period in which the reference voltage signal Ramp is sweeping (time t3 to time t5). The counter circuit 10 for each of the columns counts down a clock until the output signal CMPout9 of the comparator of the column becomes "H" (time t4), and when CMPout9 becomes H, an input of the count clock is masked at the counter circuit 10 of the column, the down-count value at that time is held and the counter circuit 10 is stopped. For example, in the case where the down-count value is 512, this means that a noise component is 512.

Next, the column AD circuit 21a makes an "L" input of a comparator reset signal in a period of time t6 to time t7 and resets the function of the comparator (an output signal CMPout9 of the comparator is set to "L"). Moreover, similarly, the reference voltage signal Ramp is set to its initial value. Meanwhile, the counter circuits 10 of all columns, different from an operation of noise detection, does not perform a count reset and holds values until time t8 when a down count is performed. Moreover, by time t8, an operation mode of the counter circuit 10 is switched from a down count to an up count. Next, the column AD circuit 21a inputs, to one of the input terminals of the comparator 8 for each of the columns, a voltage of a voltage $V_{pix}$ of the vertical signal line (output signal ($\Delta V+V sig$) from each of the unit pixels 4a ($H_0$, $H_1$, ... Hn) of Hn row amplified by a floating diffusion amplifier), and, to the other input terminal, the reference voltage signal Ramp in a period from time t8 to time t10. When the former voltage is identical to the latter voltage (time t9), the comparator 8 makes an "H" output of the output signal CMPout9.

At time t8, a sweep of the reference voltage signal Ramp is started and an input of a count clock CKcnt to clock input terminals of the counter circuits 10 for all columns is started at the same time, and the input is continued in a period in which the reference voltage signal Ramp is sweeping (time t8 to time t10). The counter circuit 10 for each of the columns counts up a clock until the output signal CMPout9 of the comparator of the column becomes "H" (t9), and when CMPout9 becomes H, an input of the count clock is masked at the counter circuit 10 of the column, the up-count value at that time is held and the counter circuit 10 is stopped.

As a result of the above described operation, for example, in the case where in a column in which the down-count value is 512, an up-count value is 2512 (time t9), the value held by the counter circuit of the column is 3024. An AD conversion result of an actual signal component Vsig is "3024−1024=2000" which is obtained by excluding an offset 1024 of the counter circuit.

In this way, a scheme in which AD conversion is performed on the noise component along with the signal+noise component, a digital value is generated, and then a noise component is excluded from the digital value is called digital CDS.

A ramp-type AD conversion operation can be applied to even in the case where digital CDS is not performed. In this case, a noise component is deducted in an analog region and then AD conversion is performed on an analog amount of only the signal component (there is only a signal detection period, only one of up count or down count is sufficient for an operation of the counter circuit).

At any rate, since the ramp-type AD conversion requires that comparison for all gradations of the digital value after the AD conversion (32768 gradations in the case of 15 bits) is performed within a predetermined time, a count clock to be inputted into the counter circuit 10 included in the column AD circuit 21a needs to have a high frequency to meet that. The problem of the AD conversion based on this scheme relates to clock propagation.

The following will describe a counter circuit of the Double Data Rate (DDR) scheme as a means for easing the problem with the clock propagation while speeding up the AD conversion (enhancing a frame rate) and enhancing a conversion bit width for enhancing image quality. In the DDR scheme, a structure of a counter circuit is changed and a count is performed with both a rising edge and a falling edge of one cycle of a count clock CKcnt.

Conversely, a scheme in which the counter circuit 10 comprises only an asynchronous counter (a scheme of counting one cycle of the count clock CKcnt, for example, only with a rising edge) is called a Single Data Rate (SDR) scheme.

The counter circuit of the SDR scheme determines from the least significant bit to the most significant bit as a ripple counter and performs a count with only one of the rising and falling edges of one cycle of the count clock (In other words, a count of +1 or −1 is performed by one cycle of the count clock). In this scheme, there is no problem as long as a pulse does not completely collapse even if there is a change in the clock duty.

Meanwhile, the counter circuit of the DDR scheme determines that a latch circuit in which a count clock is inputted as data is the least significant bit, and determines that from the second bit to the most significant bit are grouped as ripple counter as similarly to the SDR scheme, and performs a count with both of the rising and falling edges of one cycle of the count clock (In other words, a count of +1 or −a is performed by half a cycle of the count clock) by inputting a count clock into a data input terminal of a latch circuit for the least significant bit and a flip-flop clock input terminal which corresponds to the least significant bit of the ripple counter (the second bit of the counter of the DDR scheme).

Figure 3:
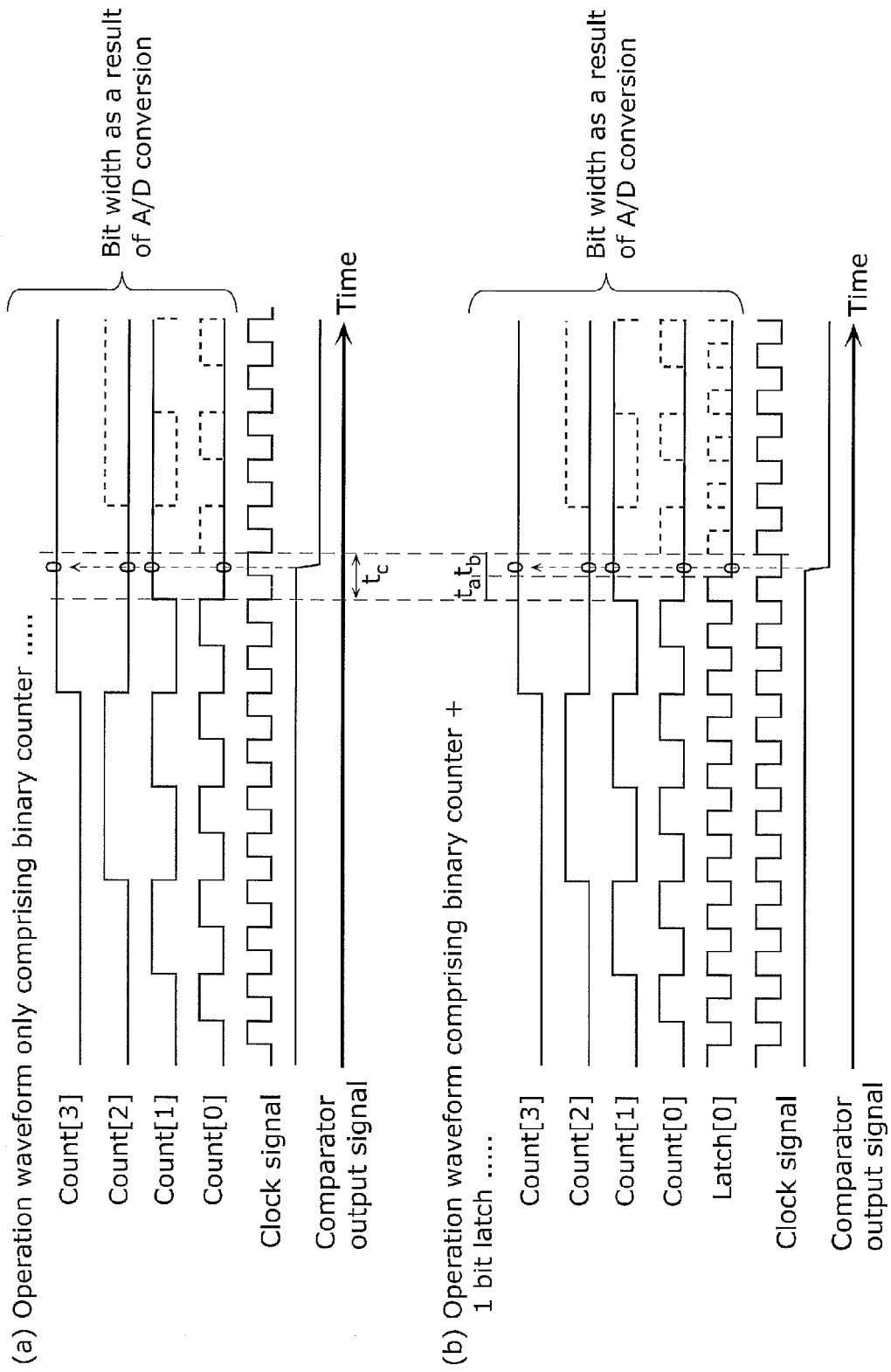
FIG. 3 shows, in each of (a) and (b), an example of operation waveform according to the SDR scheme and the DDR scheme of the counter circuit embedded in the column AD circuit according to Embodiment 1 of the present invention.

The following will describe a difference in counter operation between the SDR scheme and the DDR scheme with reference to (a) and (b) of FIG. 3.

FIG. 3, in (a), shows an example of operation waveform according to the SDR scheme of the counter circuit embedded in the column AD circuit according to Embodiment 1 of the present invention. FIG. 3, in (b), shows an example of operation waveform according to the DDR scheme of the counter circuit embedded in the column AD circuit according to Embodiment 1 of the present invention. With respect to the count clock with the same frequency, the difference between (a) of FIG. 3 which shows the operation waveform of the counter circuit of the SDR scheme and (b) of FIG. 3 which shows the operation waveform of the count clock of the DDR scheme is a latch of the least significant bit added in the DDR scheme (Latch [0] in the waveform diagram). With this, since it is possible to distinguish $t_a$ period from $t_b$ period of one cycle $t_c$ of the count clock and the count frequency is doubled, the speedup of the AD conversion and improvement of the bit accuracy are effective. Instead of increasing the frequency of the count clock CKcnt with the SDR scheme unchanged, it is favorable that the counter circuit of the DDR scheme is adopted from a standpoint of power source noise (fluctuation) and GND noise and lower power consumption (also including power consumption at peak time and average electric power).

In the column AD converter including the counter circuits of the above described SDR scheme and the DDR scheme, a high-speed clock input is necessary and especially in the DDR scheme, there is a problem with the quality of waveform such as the clock duty.

Here, the following will describe a clock tree structure for smoothly operating a counter circuit of the DDR scheme and for avoiding breaking the "H" width (pulse) and the "L" width (pulse) of the count clock CKcnt (for example, the duty of the clock is maintained at an ideal 50 pct).

Figure 4A:
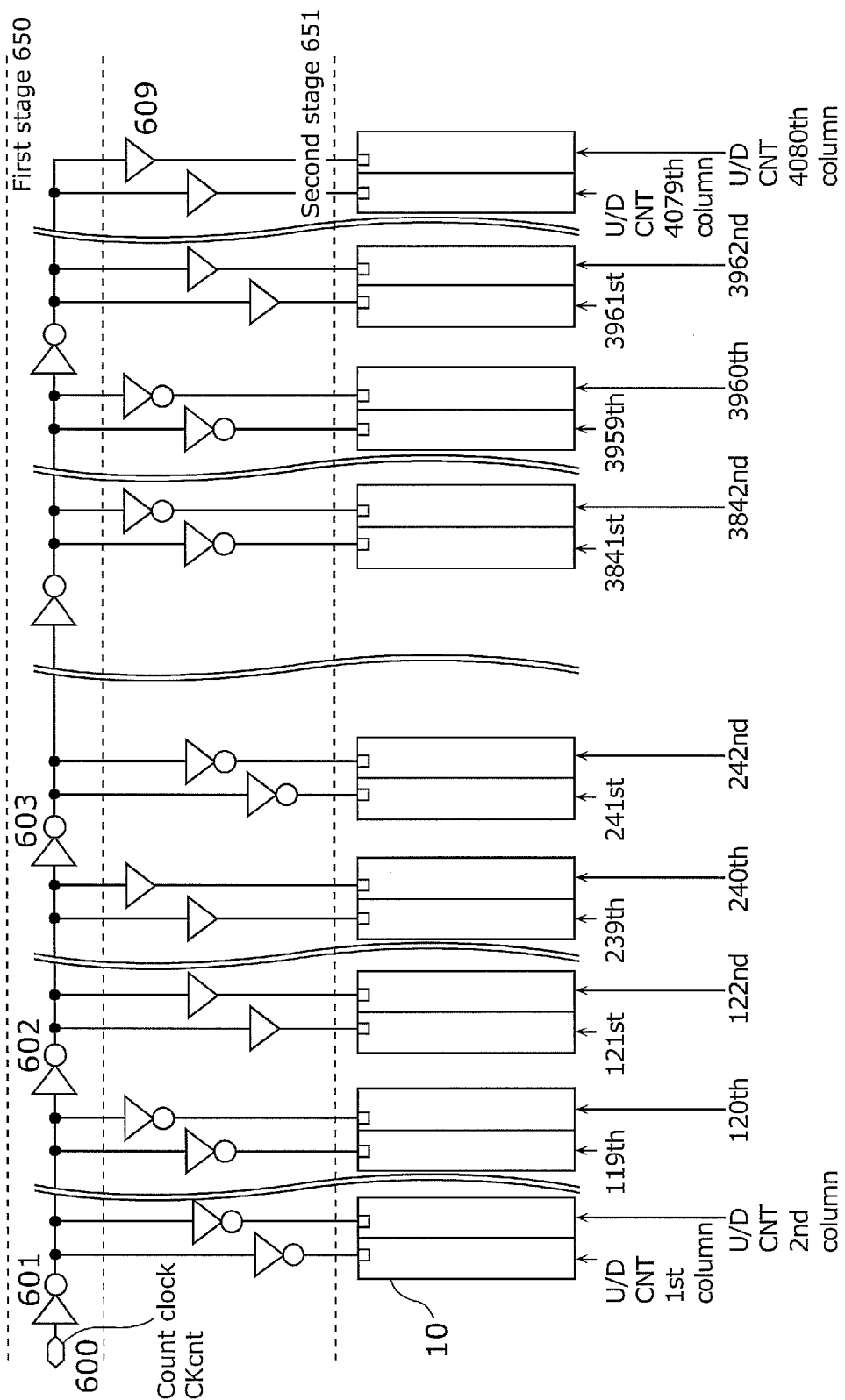
FIG. 4A is a block diagram of a clock tree of a count clock for use in a MOS-type solid-state imaging device according to Embodiment 1 of the present invention.

FIG. 4A is a block diagram of a clock tree of a count clock for use in a MOS-type solid-state imaging device according to Embodiment 1 of the present invention.

The count clock CKcnt generated by the communication and timing control unit 2 is inputted into an input terminal 600 and is buffered by inverters (hereafter, also referred to as repeaters) regularly (every 120 columns in the present configuration) disposed until the column far end portion (4080th column in FIG. 4A). In other words, the column processing unit 21 has a plurality of the first inverters in which all the counter circuits 10 are connected in series at a substantially equal interval to be along a one-dimensionally arranged direction and the number of inverters is less than the number of pixel columns. Moreover, each of the counter circuits 10 belongs to any of M column counter circuit groups which correspond to each of the M first inverters.

An upper clock stage which is a region of repeaters regularly disposed (column circuit group of every 120 columns) is determined to be a first stage 650. Since the repeaters which are regularly disposed in the first stage 650 are not buffers but inverters, polarity of a signal (negative polarity/positive polarity) is different for each of the 120 columns (column counter circuit group). For example, an output signal of an inverter 601 becomes inverse polarity with respect to an input terminal 600 (excluding a delay), and an output signal of an inverter 602 becomes the same polarity with respect to the input terminal 600 (excluding a delay). In order to unify the polarities, 120 second inverters (every 10 counter circuits) are connected in parallel between a node between the output terminal of the inverter 601 and the input terminal of the inverter 602, and the counter circuit 10. Meanwhile, 120 buffers (each of the buffers is provided for every counter circuit 10) are connected in parallel between a node between the output terminal of the inverter 602 and the input terminal of an inverter 603, and the counter circuit 10 (Hereafter, the former is called a group of columns of negative polarity and the latter is called a group of columns of positive polarity). The second inverters and buffers disposed in parallel are disposed in the second stage 651 that is a lower clock stage. The output signal of the group of columns of negative polarity and the output signal of the group of columns of positive polarity are each inputted into the counter circuit 10 for each of the columns. Although it is defined that "inverters are disposed at every 120 columns in the first stage 650," it is not necessary to cling to every 120 columns depending on fan-in and fan-out for each of the inverters. Moreover, for example, if hierarchization is performed for every 120 columns in the 12 million pixel MOS sensor which has a total of just 4000 columns, a group of columns of a fractional point is generated as shown in Expression 3.

[Math. 3]

$$4000 \text{ columns} = 120 \text{ columns} \times 33 \text{ groups} + 40 \text{ columns} \times 1 \text{ group} \quad \text{(Expression 3)}$$

In this case, for example, a group of 40 columns may be provided at the farthest end side, or part of the groups may have 122 columns as shown in Expression 4.

[Math. 4]

$$4000 \text{ columns} = 122 \text{ columns} \times 20 \text{ groups} + 120 \text{ columns} \times 13 \text{ groups} \quad \text{(Expression 4)}$$

In the above description, comparison is made based on a standard of 120 columns×33 groups=3960 columns.

In a configuration determined by Expression 3, a load may be added to a clock signal wiring of a repeater which drives 40 columns in the final stage. Moreover, since it is a repeater in the final stage which is located at the farthest end side even in the case where a load is not added, a negative impact on the waveform quality and power consumption can be restricted to the minimum.

In a configuration determined by Expression 4, 122 columns with respect to 120 columns correspond to a 1.7% increase in load, but considering a process fluctuation range, the error is within the allowable range.

In other words, in order to cause the clock tree according to the present invention to achieve the maximum merit, an equal division of columns in the second stage is most suitable as a balance of speed, waveform quality, and power consumption, but it is not necessary to exactly match the number of columns for all groups.

Moreover, the size for each of the inverters disposed in the first stage 650 may be a size that can satisfy a predetermined fan-out/fan-in ratio. The fan-out, for example, is a size which can help drive the inverter 601, while the fan-in, for example, is a load (load of 120 inverters connected to the second stage+wiring load) which gives a driving inverter (inverter 601). The fan-out/fan-in ratio is generally less than or equal to 3.

Moreover, in terms of the polarity unification, a buffer may be connected in parallel for every counter circuit 10 between a node between the output terminal of the inverter 601 and the input terminal of the inverter 602, and the counter circuit 10. In the parallel connection state, the second inverter is connected in parallel for every counter circuit 10 between the node between the output terminal of the inverter 602 and the input terminal of the inverter 603, and the counter circuit 10. Hereafter, a configuration in which the buffer and the second inverter are alternately disposed for each of the column counter circuit groups is adopted.

It should be noted that the clock tree configuration of the above described count clock, that is, the first stage 650 and the second stage 651, are disposed between the communication and timing control unit 2 according to the solid-state imaging device 1 illustrated in FIG. 1 and the counter circuit 10 which is one-dimensionally disposed. In this case, the first stage 650 and the second stage 651 may be disposed inside the column processing unit 21 and may be disposed outside the column processing unit 21 in the solid-state imaging device 1.

Figure 4B:
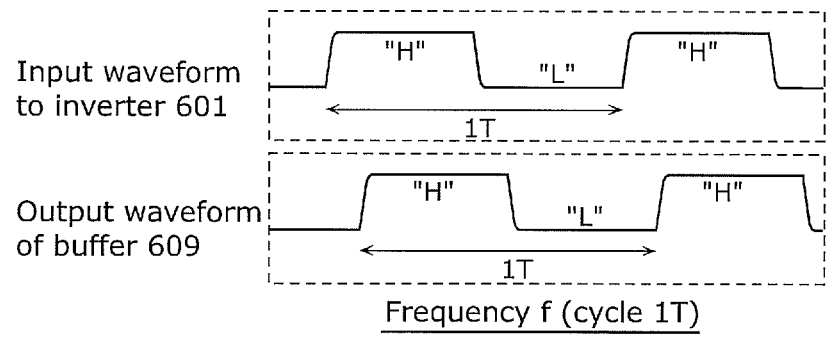
FIG. 4B is a comparison view of input and output waveforms of a clock tree structure held by the MOS-type solid-state imaging device according to Embodiment 1 of the present invention.

FIG. 4B is a view of waveform of a clock tree structure held by the MOS-type solid-state imaging device according to Embodiment 1 of the present invention. With reference to FIG. 4B, a change in waveform from an input of the inverter 601 to an input of a buffer 609 will be described.

The number of inverter stages from the input of the inverter 601 to the output of the buffer 609 is 36 stages, which represents 34 inverter stages of the first stage 650 (4080 columns/120 columns per stage) plus two buffer stages of the second stage.

The "H" width and the "L" width of the count clock gradually break up every time they pass an inverter stage, but the degree is smaller than the buffer.

For example, the "H" width is narrowed by around 5 ps per inverter stage. Here, the reason why the "H" width can be restricted to around 5 ps will be described. In the case where a buffer is used as a repeater, a load is sufficiently different between the first subinverter and the second subinverter that are serially connected to each other and are constituent elements of the buffer. Therefore, process variations in the MOS transistor appear as variations in the second subinverter influenced by an external load and the variations are accumulated in one direction, with a result that a duty change per a buffer stage is 30 ps and is large.

Conversely, in the case where an inverter is used as a repeater, variations in an inverter stage can be offset with the next inverter stage after the output load of the inverter is identical as much as possible and the size of the MOS transistor is adjusted. As a result, in the duty change per an inverter stage, for example, in the case where the "H" width is narrowed, the narrowed width is restricted to around 5 ps. In this case, in the 36 serially connected inverters, the "H" width is narrowed by 5 ps×36=180 ps (≈0.18 ns). Here, since the load of the inverter comprising the buffer 609 in the end tail is small, the duty change is almost the same as that of the inverter of the first stage 650. In the case where the input count clock frequency of the inverter 601 is 243 MHz, the "H" width (pulse) of the count clock is 2.06 ns given that one cycle of the count clock is 4.12 ns and the duty is 50%. When the count clock passes the 36 serially connected inverters, in the "H" width of the count clock, 1.88 ns which is a value made by the subtraction, from 2.06 ns, of 0.18 ns being the "H" narrowed width after the passage of the 36 serially connected inverters becomes the "H" width of the output count clock of the buffer 609 (FIG. 4B). Therefore, even in a 12 million pixel (3000 rows×4000 columns) sensor, a duty of the output signal of the buffer 609 is 188 ns/4.12 ns=45.8% and therefore 45% or higher can be maintained.

Figure 4C:
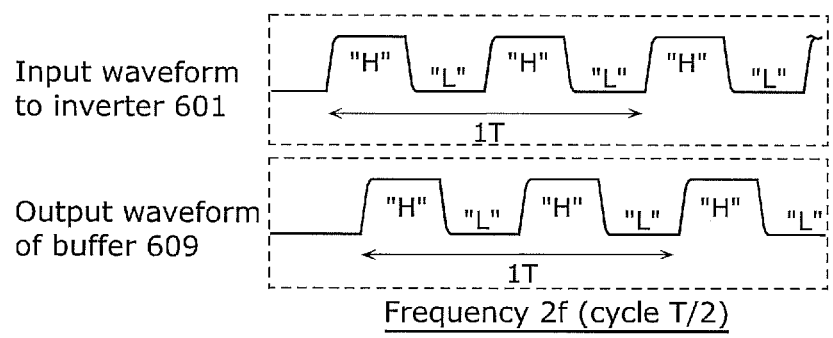
FIG. 4C is a comparison view of input and output waveforms of a clock tree structure in which a count clock frequency is doubled for use in the MOS-type solid-state imaging device according to Embodiment 1 of the present invention.

FIG. 4C is a view of waveform of a clock tree structure in which a count clock frequency for use in the MOS-type solid-state imaging device according to Embodiment 1 of the present invention is doubled. Moreover, FIG. 4C shows the case where the frequency of the count clock inputted into the inverter 601 is doubled compared with FIG. 4B. For example, in the case where the frequency of the count clock is increased to 243 MHz to 486 MHz, one cycle of the count clock CKcnt is 2.06 ns. Moreover, in the case where the duty is set to 50%, the "H" width of the count clock CKcnt is 1.03 ns. When the count clock CKcnt passes the 36 serially connected inverters, the "H" width of the output count clock of the buffer 609 becomes 0.85 ns which is a value made by the subtraction, from 1.03 ns, of 0.18 ns being the narrowed width of the "H" width as described the above. As shown in the waveform diagram illustrated in FIG. 4C, the "H" width of the output waveform of the buffer 609 is decreased with respect to the "H" width of the input waveform of the inverter 601. In this case, however, in the 12 million pixel (3000 rows×4000 columns) sensor, the duty of the output signal of the buffer 609 is maintained at 0.85 ns/2.06 ns=41.3%, which means that even when the frequency is higher, the duty can be maintained at greater than or equal to 40%.

As described the above, the MOS solid-state imaging device equipped with the ramp-type AD converter according to Embodiment 1 of the present invention can supply a count clock to each of the column AD converters, under a state in which a decrease in the duty of the count clock is restricted even if the pixel array is 12 million pixels. Therefore, it is easier to realize extension of an AD conversion bit width and an increase in the number of pixels that directly connect to improvement of image quality of still images, and it is possible to increase a frame rate and to obtain smoother moving images.

Furthermore, the number of clock buffer stages can be two stages (only the first stage and the second stage) regardless of the number of columns of column AD converters. Therefore, an increase in the layout area can be restricted.

It should be noted that in the case where a clock signal of antiphase is inputted, the same effect can be obtained through a switch between the disposition of a group of columns with negative polarity of the second stage and the disposition of a group of columns with positive polarity of the second stage.

Embodiment 2

Embodiment 2 of the present invention will be described with reference to the drawings. It should be noted that the description will focus on the difference from Embodiment 1 and the remaining part is the same as Embodiment 1.

Figure 5:
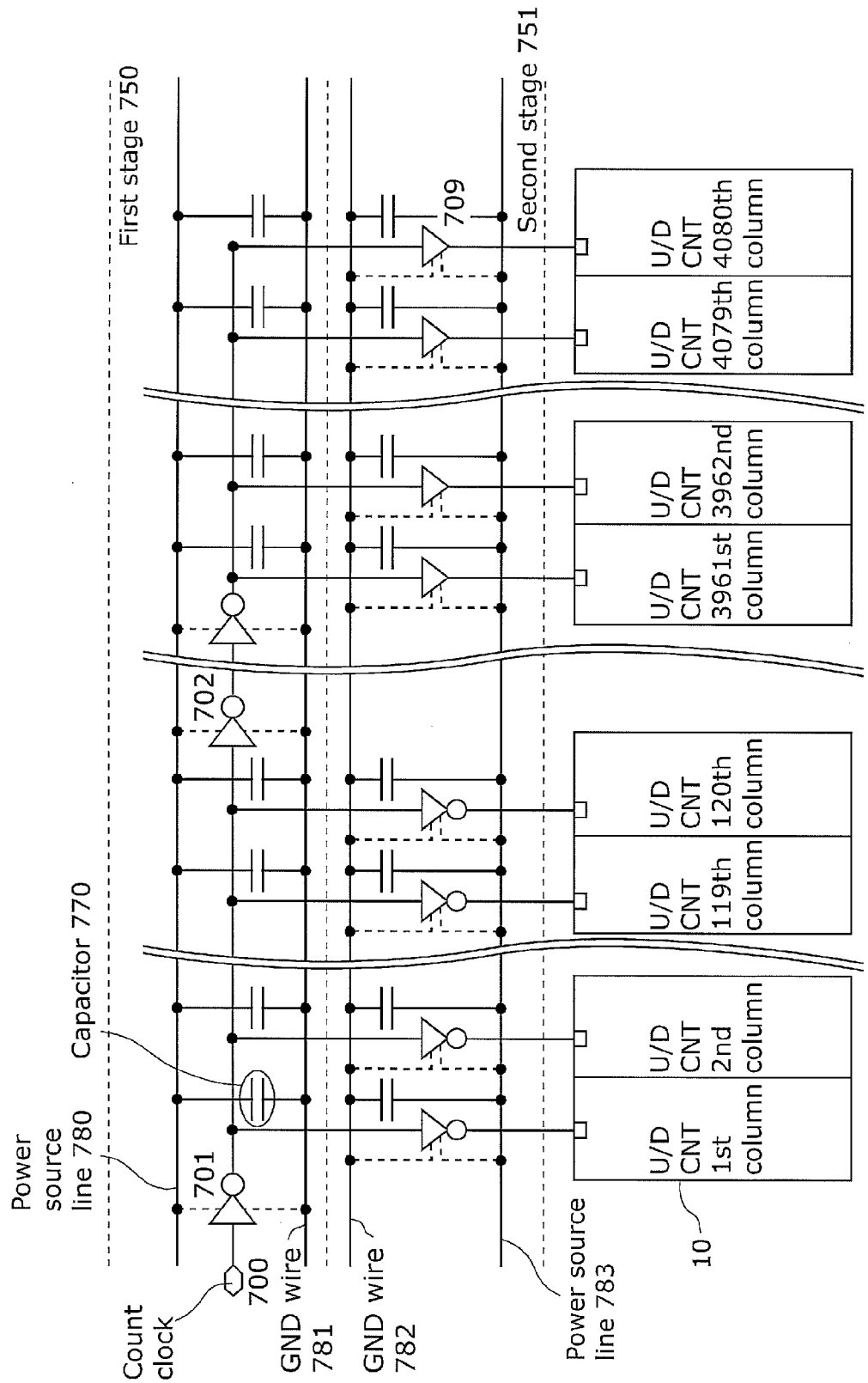
FIG. 5 is a block diagram of a clock tree of a count clock for use in a MOS-type solid-state imaging device according to Embodiment 2 of the present invention.

FIG. 5 is a block diagram of a clock tree of a count clock for use in the MOS-type solid-state imaging device according to Embodiment 2 of the present invention.

The count clock CKcnt generated by the communication and timing control unit 2 is inputted into an input terminal 700 and is buffered as needed by inverters (so-called repeaters) regularly (every 120 columns in the present configuration) disposed until the column far end portion (4080th column in FIG. 5). In other words, the column processing unit 21 has a plurality of the first inverters in which all the counter circuits 10 are connected at a substantially equal interval to be along a one dimensionally arranged direction and the number of inverters is less than the number of pixel columns. Moreover, each of the counter circuits 10 belongs to any of M column counter circuit groups which correspond to each of the M first inverters.

An upper clock stage which is a region of repeaters regularly disposed (for every column circuit group of every 120 columns) is determined to be a first stage 750. Since the repeaters which are regularly disposed (for every column circuit group of every 120 columns) in the first stage 750 are not buffers but inverters, polarity of a signal (negative polarity/positive polarity) is different for every 120 columns (column counter circuit group). For example, an output signal of an inverter 701 becomes negative polarity with respect to the input terminal 700, and an output signal of an inverter 702 becomes positive polarity with respect to the input terminal 700. In order to unify the polarities, 120 second inverters (every 10 counter circuits) are connected in parallel between a node between the output terminal of the inverter 701 and the input terminal of the inverter 702, and the counter circuit 10. Meanwhile, 120 buffers (every 10 counter circuits) are connected in parallel between a node between the output terminal of the inverter 702 and the input terminal of the next inverter, and the counter circuit 10. The second inverters and buffers disposed in parallel are disposed in a second stage 751 that is a lower clock stage. The second inverters (or buffers) provided in the second stage 751 and the counter circuit simultaneously operate by a 120 column unit.

In Embodiment 2, compared with Embodiment 1, peak noise (power source fluctuation and GND fluctuation) generated by the inverters (or buffers) and the counter circuit 10 is further restricted.

An example of a method of restricting peak noise will be described. First, a capacitor 770 is disposed in each of the columns (a total of 4080 columns) of the second stage 751. The capacitor 770 disposed in the second stage 751 is connected between a power source line 783 and a GND wire 782 as a means for restricting voltage fluctuation in the power source line 783 which is a second power source line for supplying voltage or electric current to the second inverters and buffers of the second stage 751 and the GND line 782 which is a second ground wire. It should be noted that a power source which is a connection destination for the power source line 783 is shared at the up/down counter circuit under the second stage.

Next, a plurality of the capacitors 770 are disposed between repeater regions regularly disposed (every 120 columns) as a means for restricting voltage fluctuation in the power source line 780 which is a first power source line for supplying voltage or electric current to the first inverter of the first stage 750 and the GND wire 781. The disposed capacitors 770 are connected between the power source line 780 and the GND wire 781 as a means for restricting voltage fluctuation in the power source line 780 which is the first power source line disposed in the first stage 750 and the GND wire 781 which is the first ground wire. It should be noted that the GND wire 782 and the GND wire 781 may be commonly grounded.

The capacitor 770 with the described above connection relationship is so-called a decoupling capacitor, and has a function of shortening a distance as much as possible in which a charge transfers in a power source line and a ground wire and restricting a wiring loop area in which supply current is flowing. With this, the inverter and the buffer are not affected by voltage fluctuation caused by operations of the other inverter and buffer. With this, peak noise (power source fluctuation and GND fluctuation) generated by the first stage 750, the second stage 751, and the counter circuit 10 can be restricted. As a result, the narrowed width of the "H" width or the "L" width of the count clock CKcnt can be improved.

Embodiment 3

Figure 6:
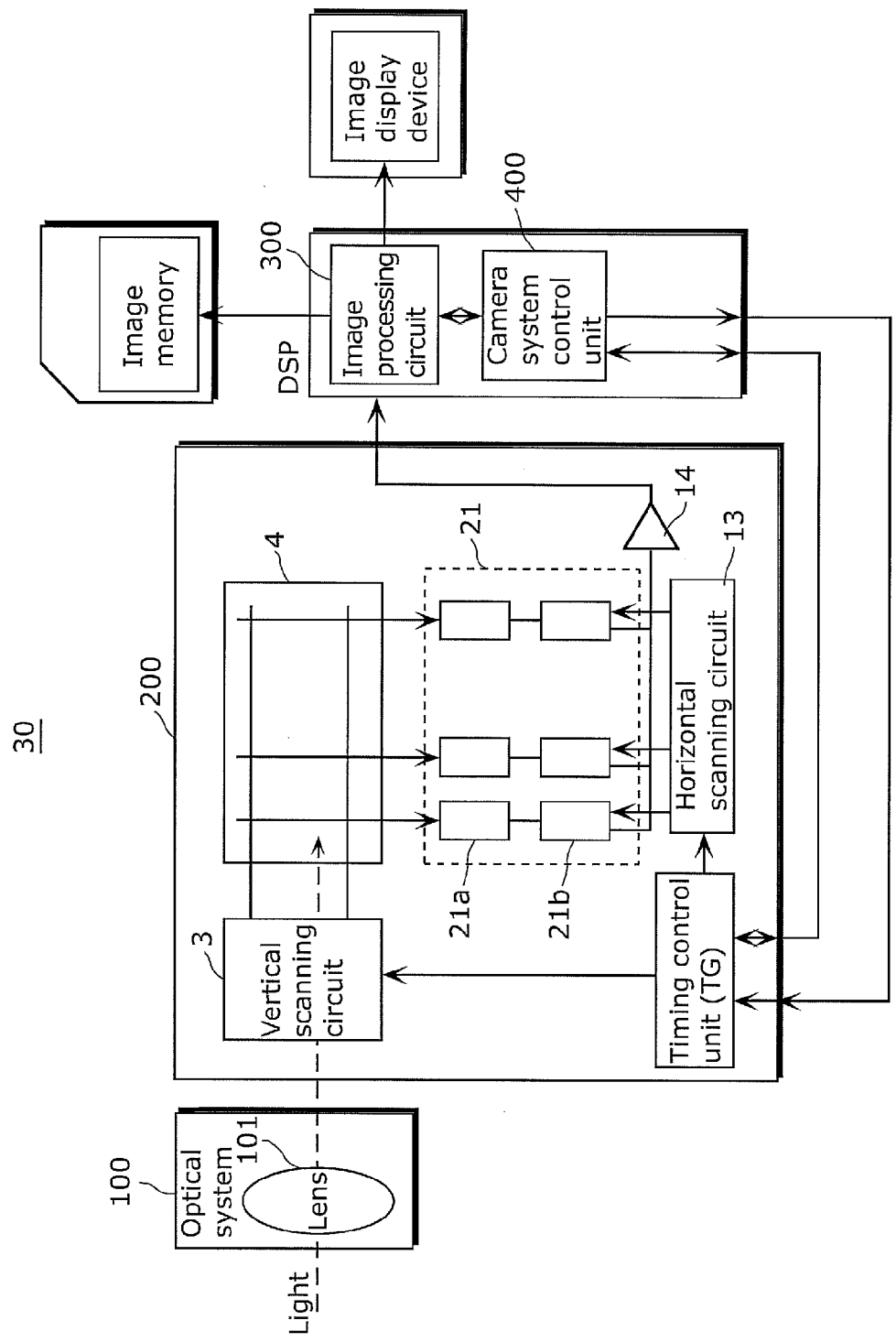
FIG. 6 is a functional block diagram of an imaging device (camera) according to Embodiment 3 of the present invention.
Figure 7:
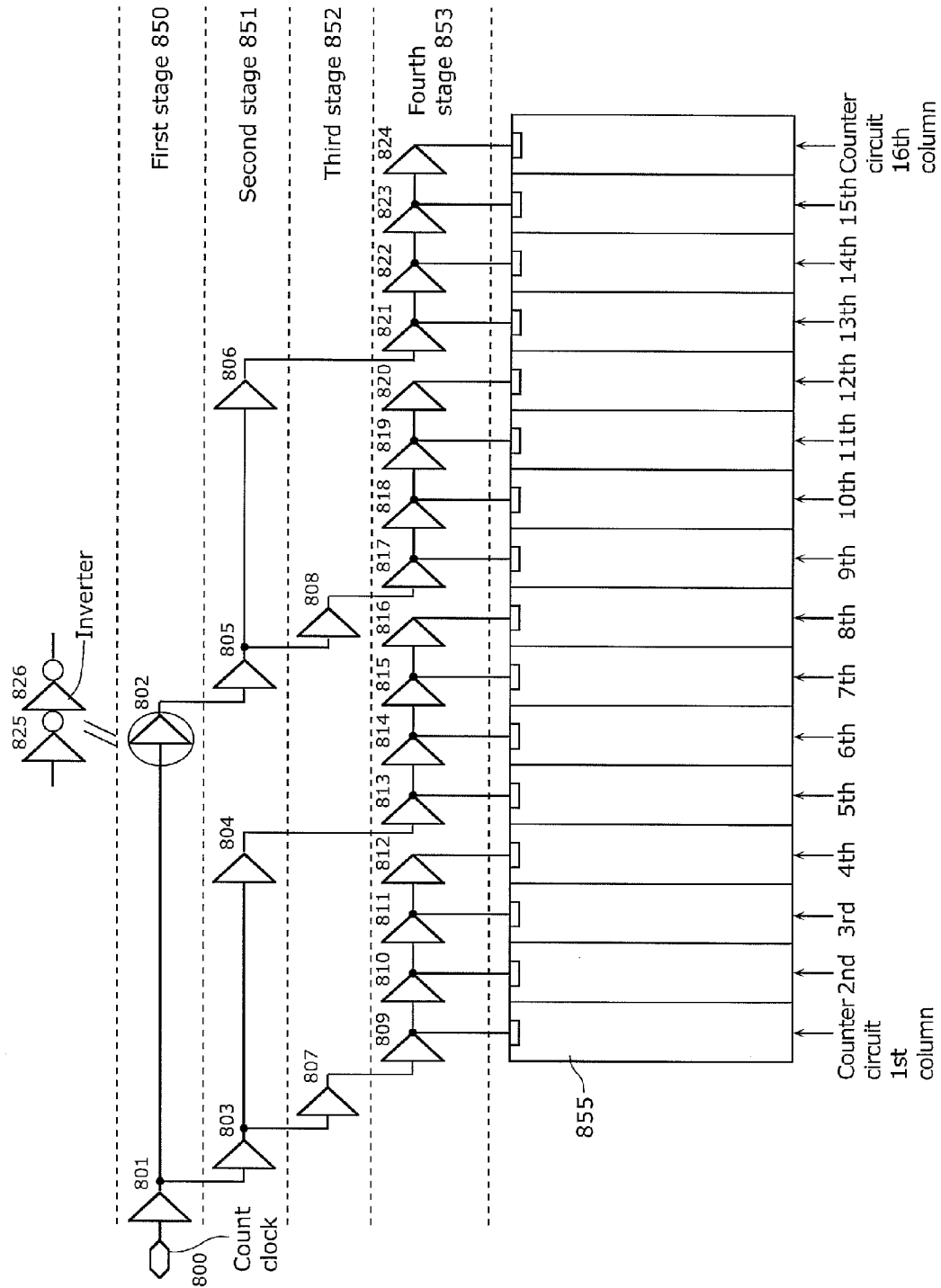
FIG. 7 is an example of a block diagram of a column AD converter using a buffering technique disclosed in Patent Literature 2.
Figure 8A:
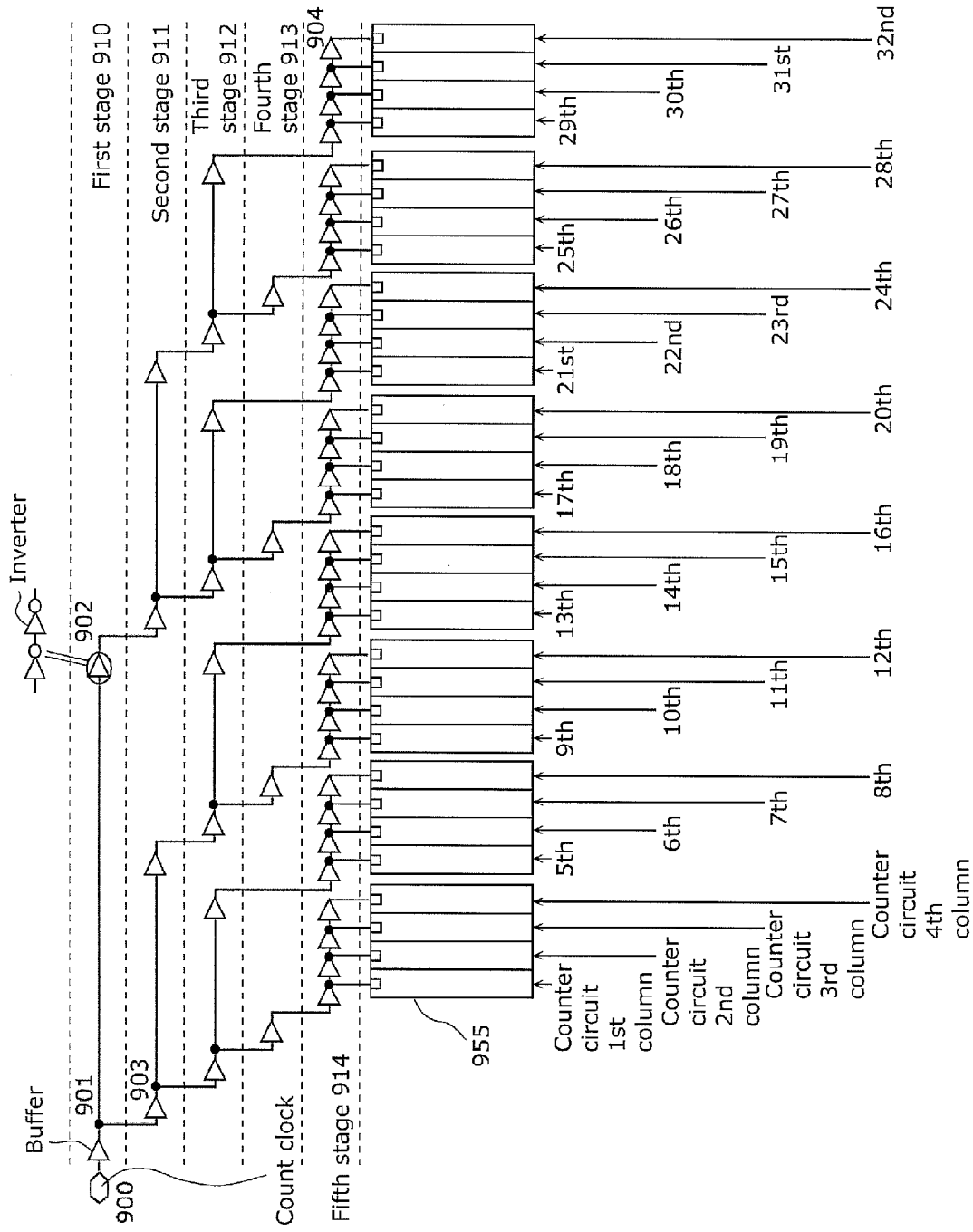
FIG. 8A is an example of a block diagram of a column AD converter using a buffering technique disclosed in Patent Literature 2.
Figure 8B:
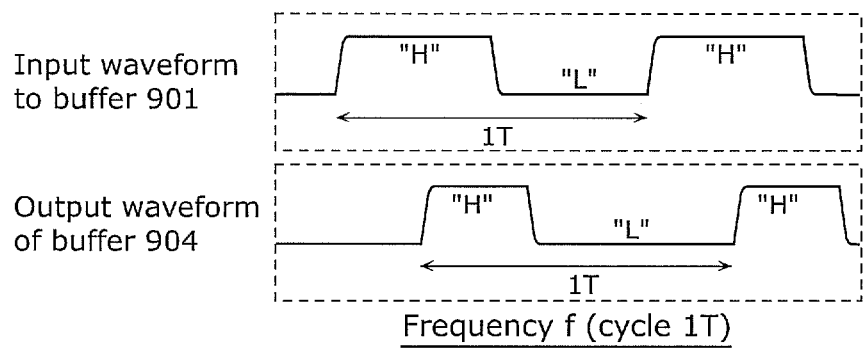
FIG. 8B is a comparison view of input and output waveforms of a buffer comprising a clock tree.
Figure 8C:
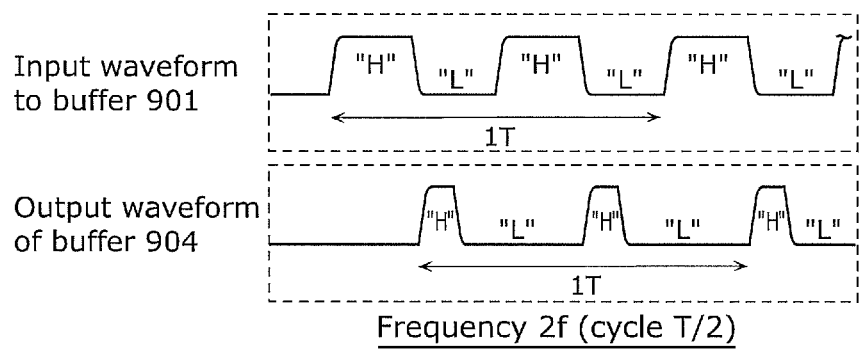
FIG. 8C is a comparison view of input and output waveforms of a buffer comprising a clock tree in the case where a count clock frequency is doubled.

FIG. 6 is a functional block diagram of an imaging device (camera) according to Embodiment 3 of the present invention.

As illustrated in FIG. 6, an imaging device 30 according to the present invention generally includes an optical system 100, a solid-state imaging device 200, an image processing circuit 300, and a camera system control unit 400.

The optical system 100 includes a lens 101 which collects light from an object and forms an image on a pixel array of the solid-state imaging device 200 that is the solid-state imaging device which is described in Embodiment 1 and Embodiment 2 of the present invention.

The solid-state imaging device 200 includes a pixel array 4 in which unit pixels including a light-sensitive element such as a photodiode and a MOS transistor are arranged in a two-dimensional array, a vertical scanning circuit 3 which selects a unit pixel 4a of the pixel array 4 on a row-by-row basis and controls a pixel reset and readout, a column AD circuit 21a which performs AD conversion on a pixel signal read out from the pixel array 4, a column digital memory 21b which holds the pixel signal in which AD conversion is performed by the column AD circuit 21a, and a horizontal scanning circuit 13 which selects each of the columns of the column digital memory 21b and drives a readout of the held digital pixel signal.

The image processing circuit 300 is a Digital Signal Processor (DSP), or the like, which performs gamma correction, color interpolation processing, space interpolation processing, auto white balance, and the like that are necessary for camera signal processing upon receipt of the digital pixel signal outputted from the solid-state imaging device 200.

Moreover, the imaging processing circuit 300 also performs conversion into a compression format such as JPEG and recording onto a memory, and display signal processing for a liquid crystal display held by a camera.

The camera system control unit 400, according to various settings specified by user I/F (not illustrated), is a microcomputer, or the like, which controls the optical system 100, the solid-state imaging device 200, and the image processing circuit 300, and integrates the whole operation of the imaging device 30. As the user I/F, the system, for example, receives, as input, a real time instruction such as a change in zoom ratio or a release button, and performs a zoom ratio change of the lens 101, controls run of a curtain shutter and a reset scanning of the solid-state imaging device 200.

Here, the solid-state imaging device 200 includes a ramp-type AD converter and can restrict degradation of a duty of the count clock and supply the count clock to each of the column AD circuits 21a. Moreover, since the number of clock buffer stages can be two stages, an increase in a layout area can be restricted. Furthermore, by providing dedicated power source line and GND wiring for each of the clock buffer stages and adding decoupling capacity, peak electric current and an increase in noise stemming from the peak electric current can be restricted.

The imaging device 30 including the solid-state imaging device 200 makes it easier to realize extension of an AD conversion bit width and an increase in the number of pixels that directly connect to improvement of image quality of still images, and can increase a frame rate and obtain smoother moving images.

Moreover, the solid-state imaging device 200 and the imaging device 30 are configured by determining each of the function blocks illustrated in FIG. 6 as a combination of individual components, but it is acceptable for part or all of the function blocks to be integrated into a similar Integrated Circuit (IC). In the case of being configured as a combination of individual components, it is advantageous to reduce costs for the device having the imaging device. Meanwhile, in the case of integration, it is advantageous to increase a speed of the above described device.

The solid-state imaging device and the imaging device according to the present invention is described based on the embodiments, but the solid-state imaging device and the imaging device according to the present invention are not defined only by the above described embodiments. Other embodiments implemented by combination of any constituent elements according to Embodiments 1, 2, and 3, modifications to Embodiments 1, 2, and 3 obtained from those skilled in the art without materially departing from the novel teachings and advantages of this invention, and various devices including the solid-state imaging device and the imaging device are included in the present invention.

INDUSTRIAL APPLICABILITY

The present invention is especially effective as a digital still camera and a video camera, and is particularly suitable for a solid-state imaging device and a camera which need high-resolution still images and smooth moving images.

The invention claimed is:
1. A solid-state imaging device comprising:
a pixel array in which unit pixels are arranged in a two-dimensional matrix, the pixel array having N columns where N is a natural number, and the unit pixels each including a photoelectric conversion element;

readout signal lines each of which is provided for each of the pixel columns, for reading out a pixel signal from the unit pixels; and a ramp-type analog-to-digital (AD) converter which is provided adjacent to the pixel array and performs AD conversion on the pixel signal with ramp waves, the pixel signal being outputted via the readout signal lines, wherein the ramp-type AD converter includes:

a digital-to-analog (DA) conversion circuit which generates the ramp waves;

column comparison circuits each of which is provided for a corresponding one of the pixel columns, and compares the pixel signal with the ramp waves and detects a timing at which a voltage of the pixel signal and a voltage of the ramp waves match;

column counter circuits each of which is provided for a corresponding one of the pixel columns and measures a period of time from a start of comparison in the column comparison circuit to the timing by being supplied with a clock signal; and M first inverters which are connected in series at substantially equal intervals such that all of the column counter circuits are along a direction in which all of the column counter circuits are one-dimensionally arranged, the M first inverters being included in an upper clock stage, and M being less than N, wherein the column counter circuit belongs to one of M column counter circuit groups which correspond one-to-one to the M first inverters, an odd-numbered group of the column counter circuits has second inverters each of which is for each of the column counter circuits, the second inverters being disposed in a lower clock stage and being between an output terminal of one of the first inverters corresponding to the column counter circuit group and one of the column counter circuits belonging to the column counter circuit group, an even-numbered group of the column counter circuits has buffers each of which is for each of the column counter circuits, the buffers being disposed in the lower clock stage and being between the output terminal of one of the first inverters corresponding to the column counter circuit group and one of the column counter circuits belonging to the column counter circuit group, and the clock signal is distributed to the column counter circuit in an order of the upper clock stage and the lower clock stage.

2. The solid-state imaging device according to claim 1, wherein the clock signal (i) is inputted from an input terminal of the first inverter corresponding to a column counter circuit group located first among the column counter circuit groups, (ii) passes the first inverter corresponding to a column counter circuit group to which a column counter circuit belongs, (iii) passes the output terminal of the first inverter, and the second inverter or the buffer connected between the output terminal and the column counter circuit, and (iv) is distributed to the column counter circuit, the first inverter being included in the upper clock stage.

3. The solid-state imaging device according to claim 1, wherein the column counter measures a period of time from the start of comparison circuit to the timing, by using both rising and falling edges of a waveform of the distributed clock signal.

4. The solid-state imaging device according to claim 1, wherein the upper clock stage includes a first power source line and a first ground wire for supplying voltage or electric current to the M first inverters, and a decoupling capacitor between the first power source line and the first ground wire.

5. The solid-state imaging device according to claim 1, wherein the lower clock stage includes a second power source line and a second ground wire for supplying voltage or electric current to all second inverters and all the buffers, and a decoupling capacitor between the second power source line and the second ground wire.

6. The solid-state imaging device according to claim 4, wherein the decoupling capacitor is disposed corresponding to each of the M first inverters.

7. The solid-state imaging device according to claim 4, wherein the decoupling capacitor is disposed for each of the pixel columns.

8. A solid-state imaging device comprising:

a pixel array in which unit pixels are arranged in a two-dimensional matrix, the pixel array having N columns where N is a natural number, and the unit pixels each including a photoelectric conversion element;

readout signal lines each of which is provided for each of the pixel columns, for reading out a pixel signal from the unit pixels; and a ramp-type analog-to-digital (AD) converter which is provided adjacent to the pixel array and performs AD conversion on the pixel signal with ramp waves, the pixel signal being outputted via the readout signal lines, wherein the ramp-type AD converter includes:

a digital-to-analog (DA) conversion circuit which generates the ramp waves;

column comparison circuits each of which is provided for a corresponding one of the pixel columns, and compares the pixel signal with the ramp waves and detects a timing at which a voltage of the pixel signal and a voltage of the ramp waves match;

column counter circuits each of which is provided for a corresponding one of the pixel columns and measures a period of time from a start of comparison in the column comparison circuit to the timing by being supplied with a clock signal; and M first inverters which are connected in series at substantially equal intervals such that all of the column counter circuits are along a direction in which all of the column counter circuits are one-dimensionally arranged, the M first inverters being included in an upper clock stage, and M being less than N, wherein the column counter circuit belongs to one of M column counter circuit groups which correspond one-to-one to the M first inverters, an odd-numbered group of the column counter circuits has buffers each of which is for each of the column counter circuits, the buffers being disposed in a lower clock stage and being between an output terminal of one of the first inverters corresponding to the column counter circuit group and one of the column counter circuits belonging to the column counter circuit group, an even-numbered group of the column counter circuits has second inverters each of which is for each of the column counter circuits, the second inverters being disposed in the lower clock stage and between the output terminal of one of the first inverters corresponding to the column counter circuit group and one of the column counter circuits belonging to the column counter circuit group, and the clock signal is distributed to the column counter circuit in an order of the upper clock stage and the lower clock stage.

9. The solid-state imaging device according to claim 8, wherein the clock signal (i) is inputted from an input terminal of the first inverter corresponding to a column counter circuit group located first among the column counter circuit groups, (ii) passes the first inverter corresponding to a column counter circuit group to which a column counter circuit belongs, (iii) passes the output terminal of the first inverter, and the second inverter or the buffer connected between the output terminal and the column counter circuit, and (iv) is distributed to the column counter circuit, the first inverter being included in the upper clock stage.

10. The solid-state imaging device according to claim 8, wherein the column counter measures a period of time from the start of comparison circuit to the timing, by using both rising and falling edges of a waveform of the distributed clock signal.

11. The solid-state imaging device according to claim 8, wherein the upper clock stage includes a first power source line and a first ground wire for supplying voltage or electric current to the M first inverters, and a decoupling capacitor between the first power source line and the first ground wire.

12. The solid-state imaging device according to claim 8, wherein the lower clock stage includes a second power source line and a second ground wire for supplying voltage or electric current to all second inverters and all the buffers, and a decoupling capacitor between the second power source line and the second ground wire.

13. The solid-state imaging device according to claim 11, wherein the decoupling capacitor is disposed corresponding to each of the M first inverters.

14. The solid-state imaging device according to claim 11, wherein the decoupling capacitor is disposed for each of the pixel columns.

15. An imaging device comprising the solid-state imaging device according to claim 1.

16. An imaging device comprising the solid-state imaging device according to claim 8.

* * * * *